June 25, 1968 R. E. BRADBURY, JR 3,389,890
JACKING APPARATUS AND CONTROLS
Filed July 1, 1966 9 Sheets-Sheet 9
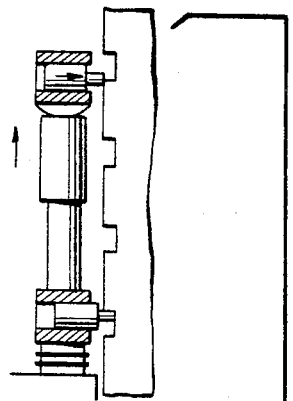
Fig.6F.
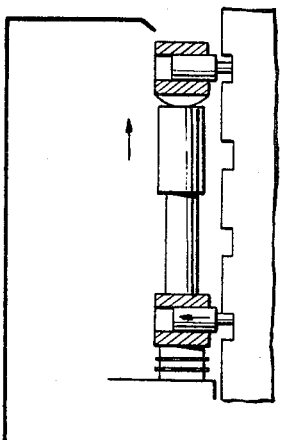
Fig.6G.
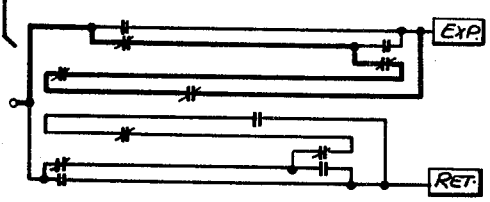
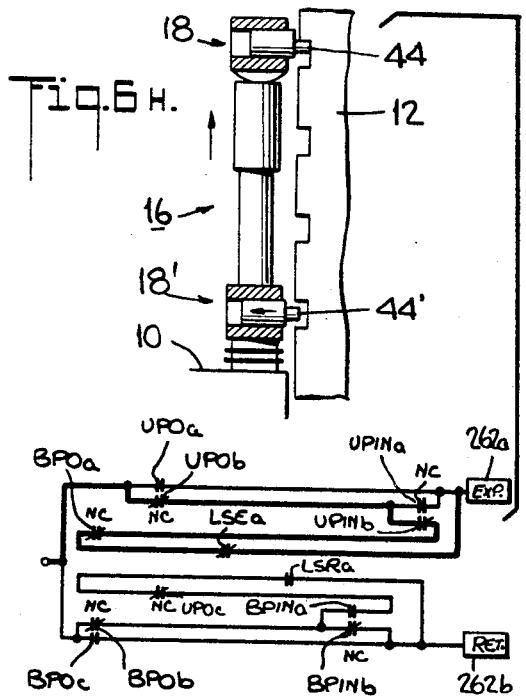
Fig.6H.
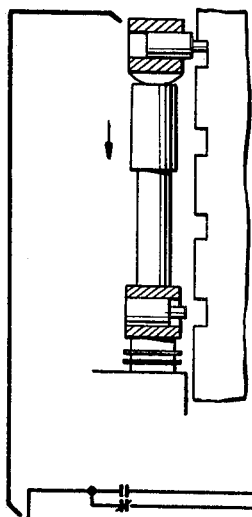
Fig.6I.
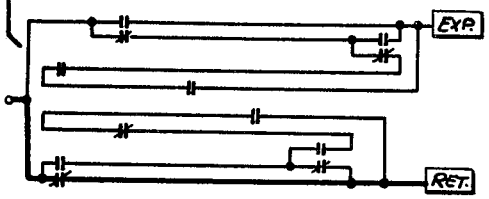
INVENTOR.
ROBERT E. BRADBURY, JR.
BY
Kenyon & Kenyon
ATTORNEYS United States Patent Office 3,389,890
Patented June 25, 1968

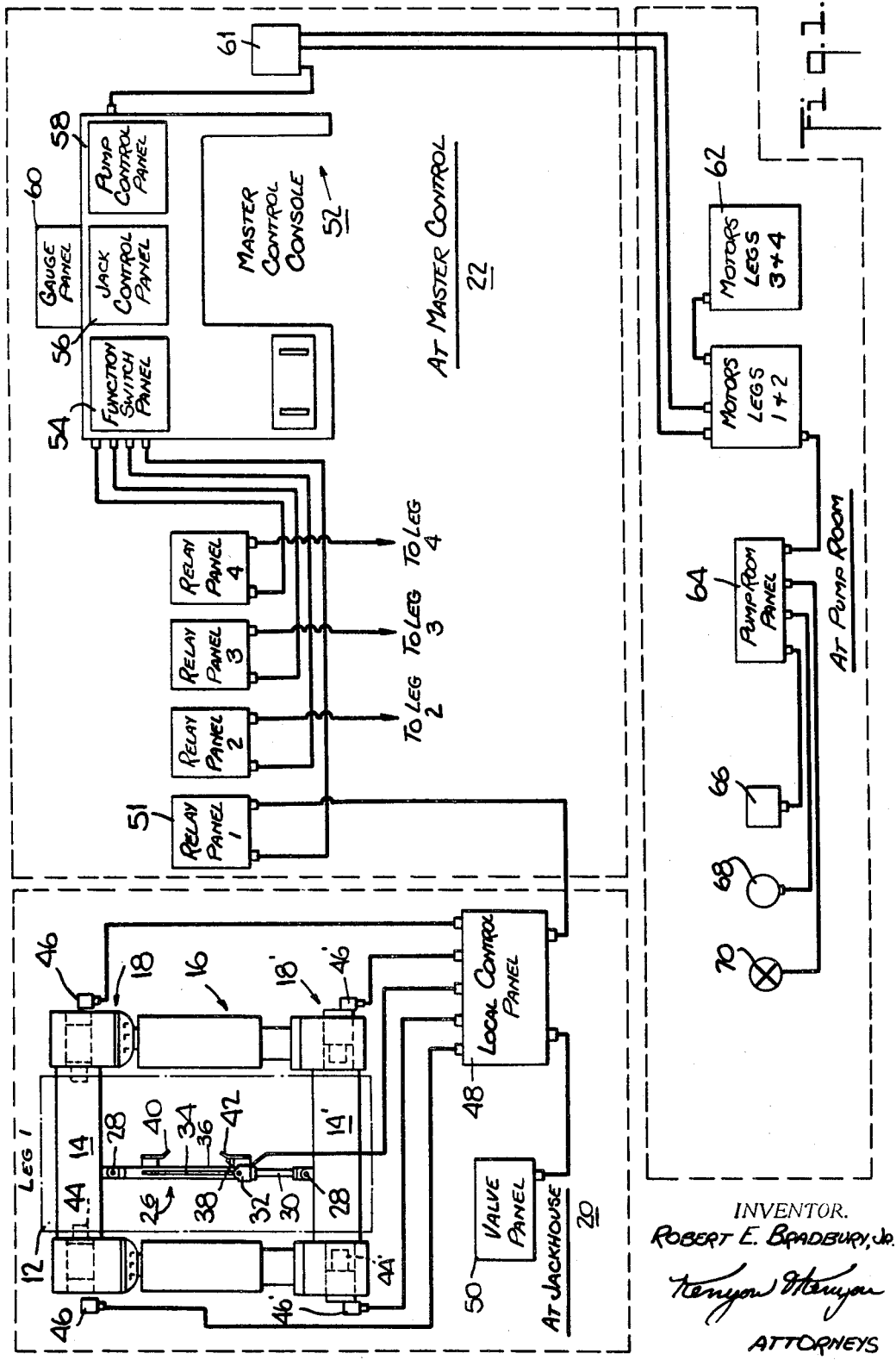

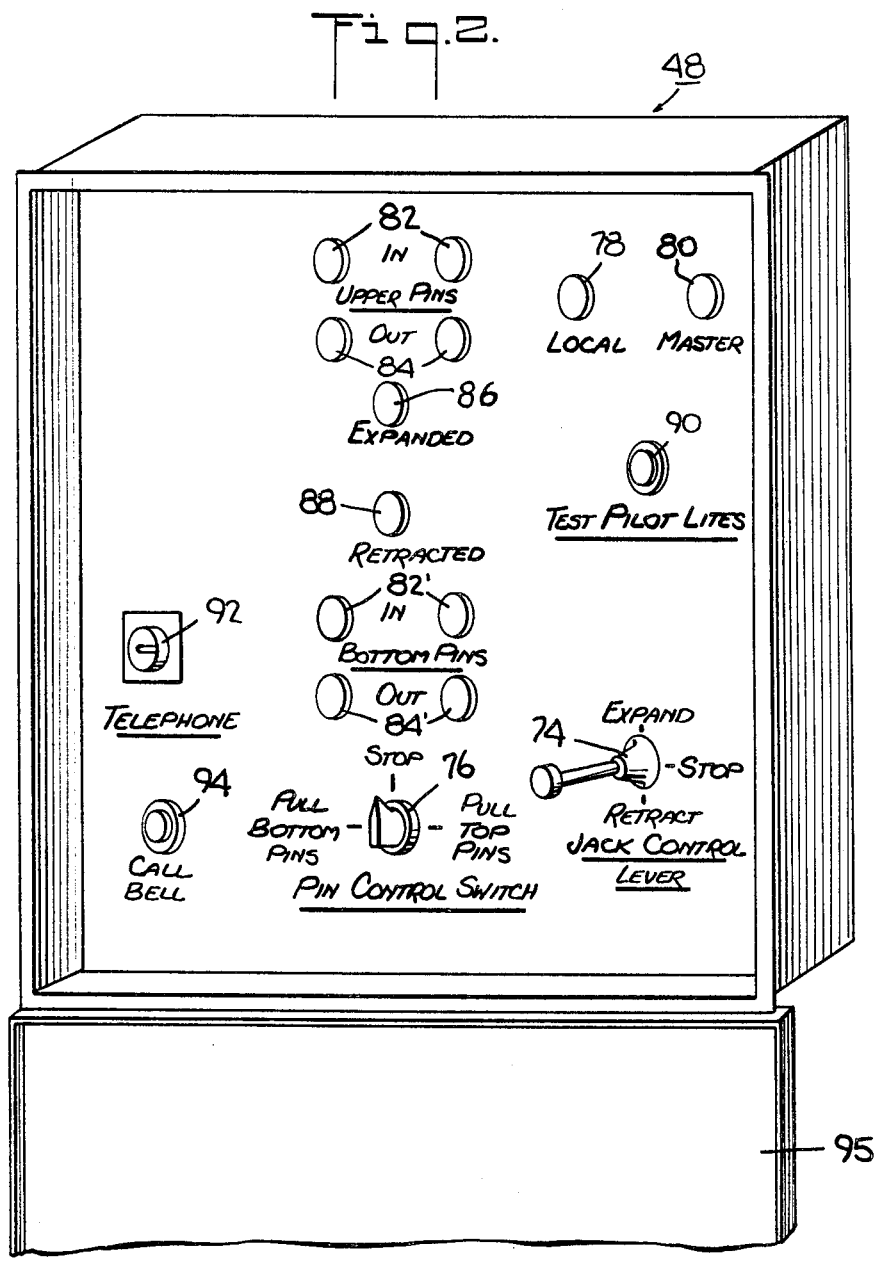

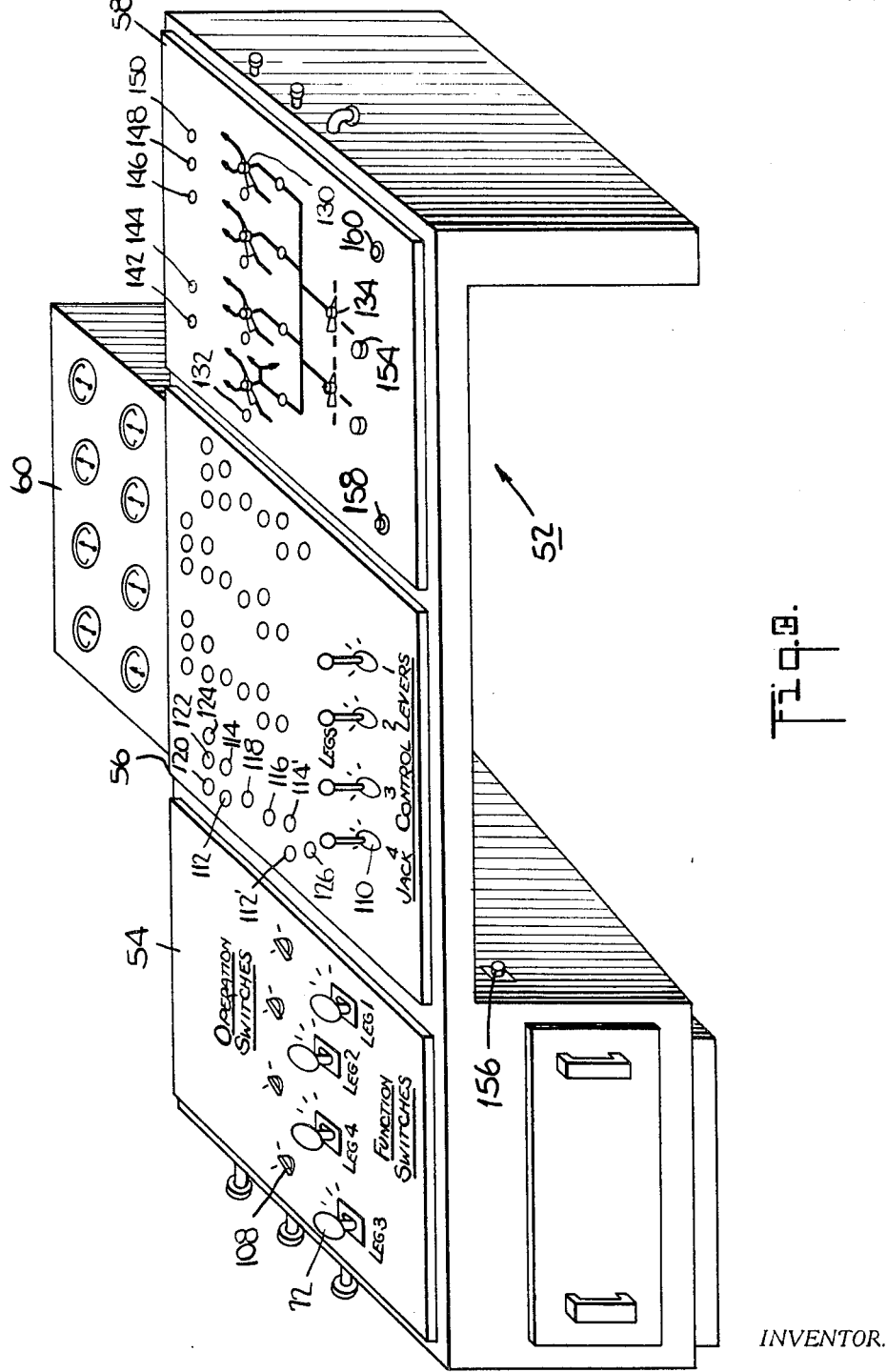

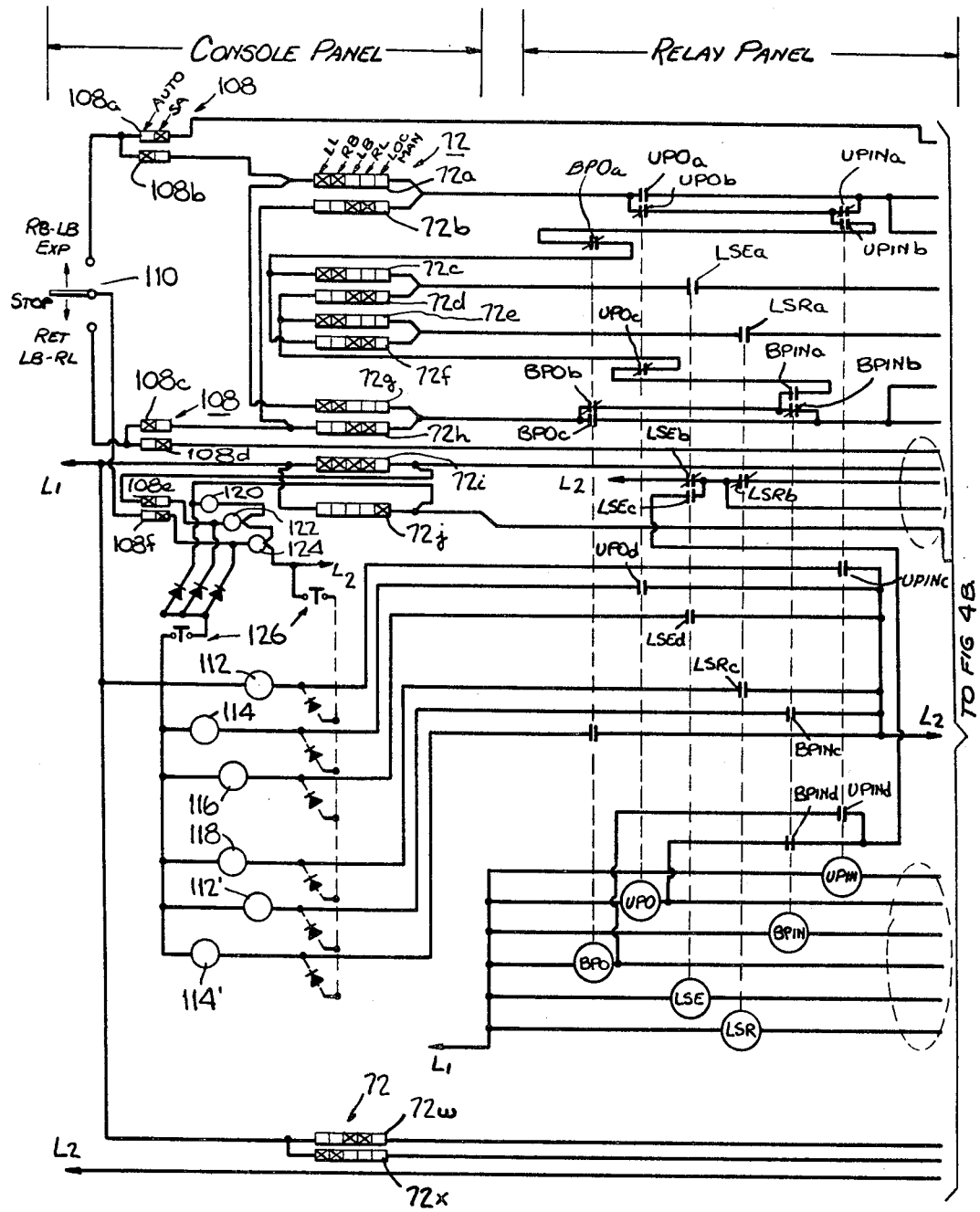

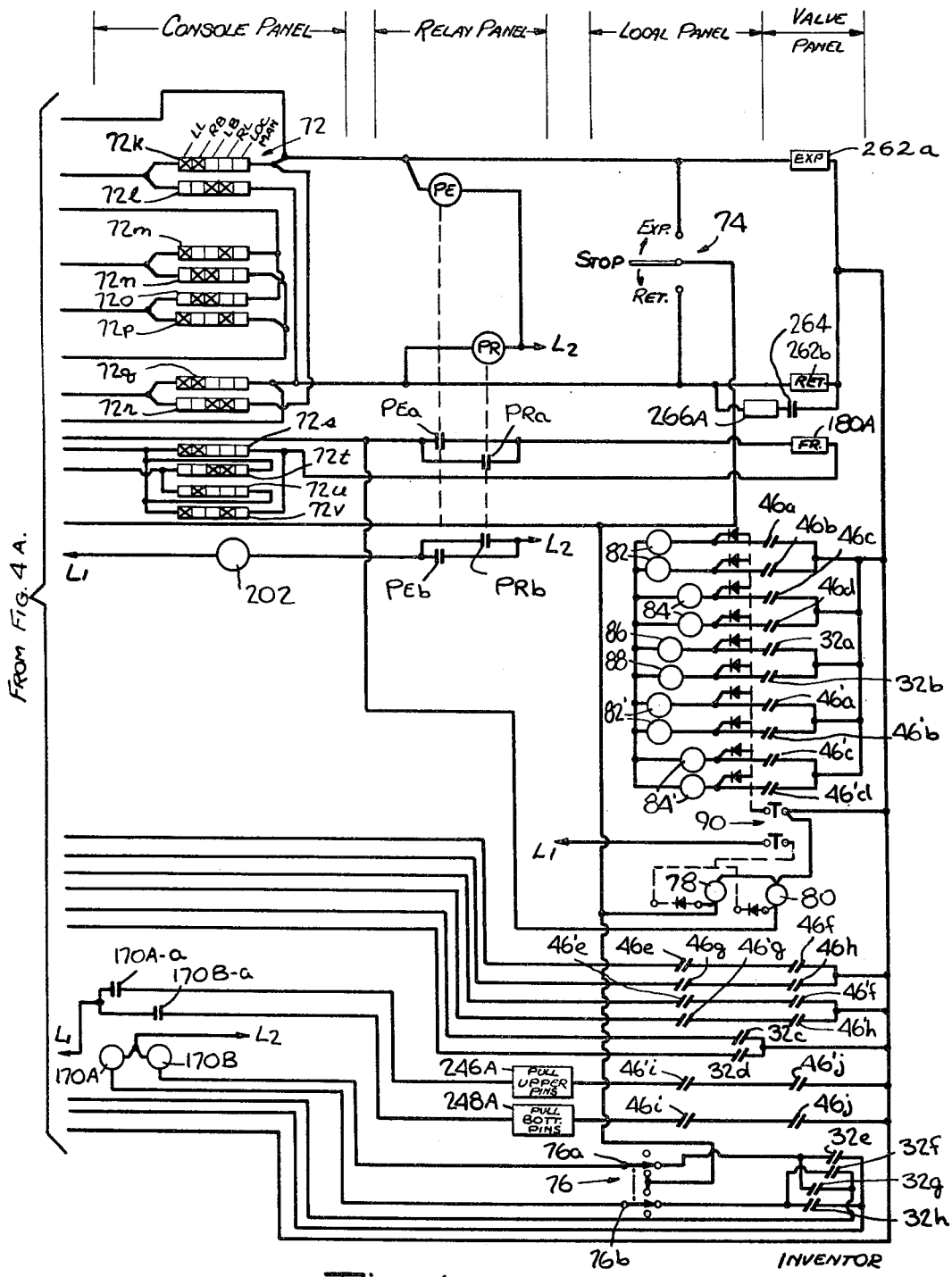

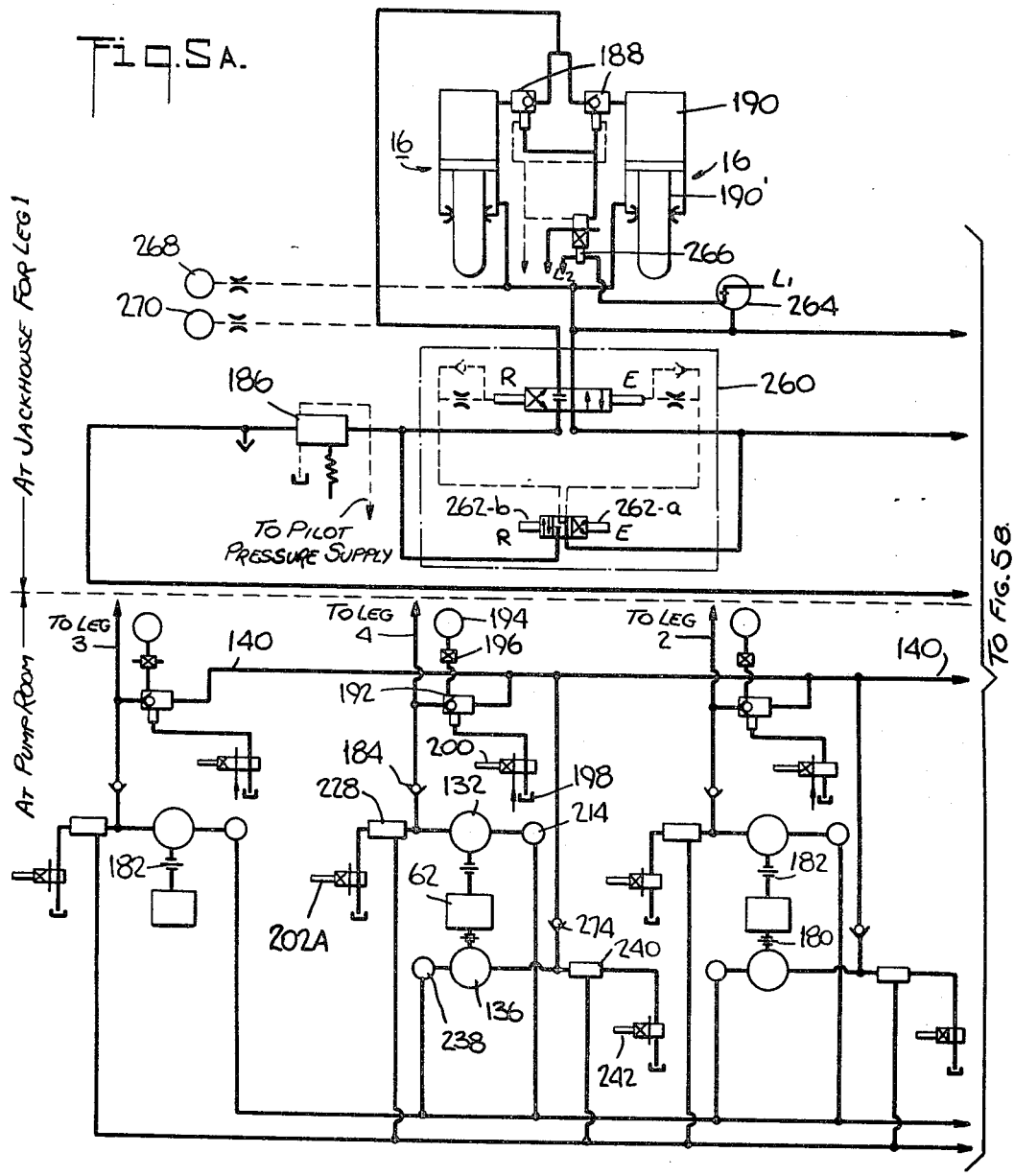

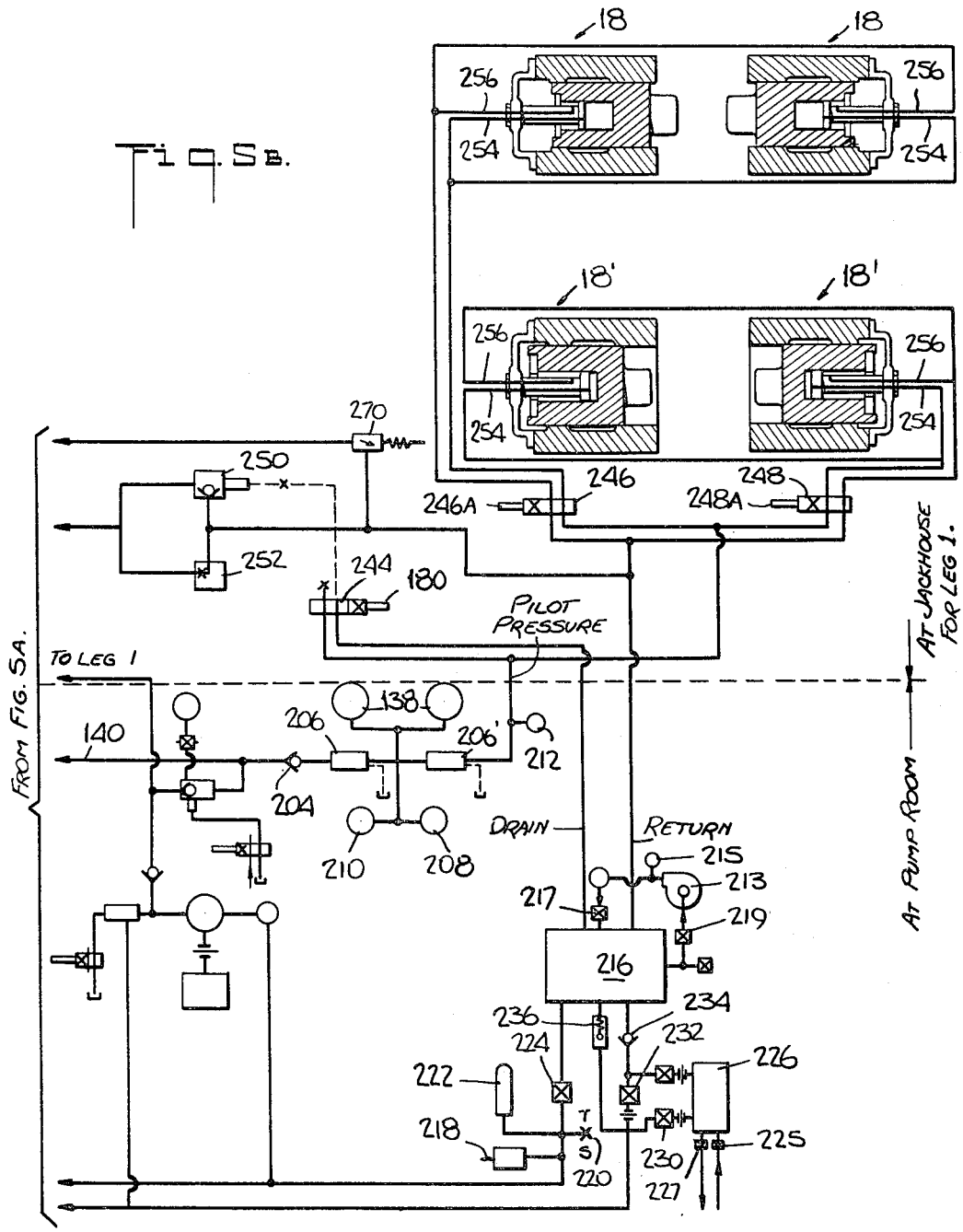

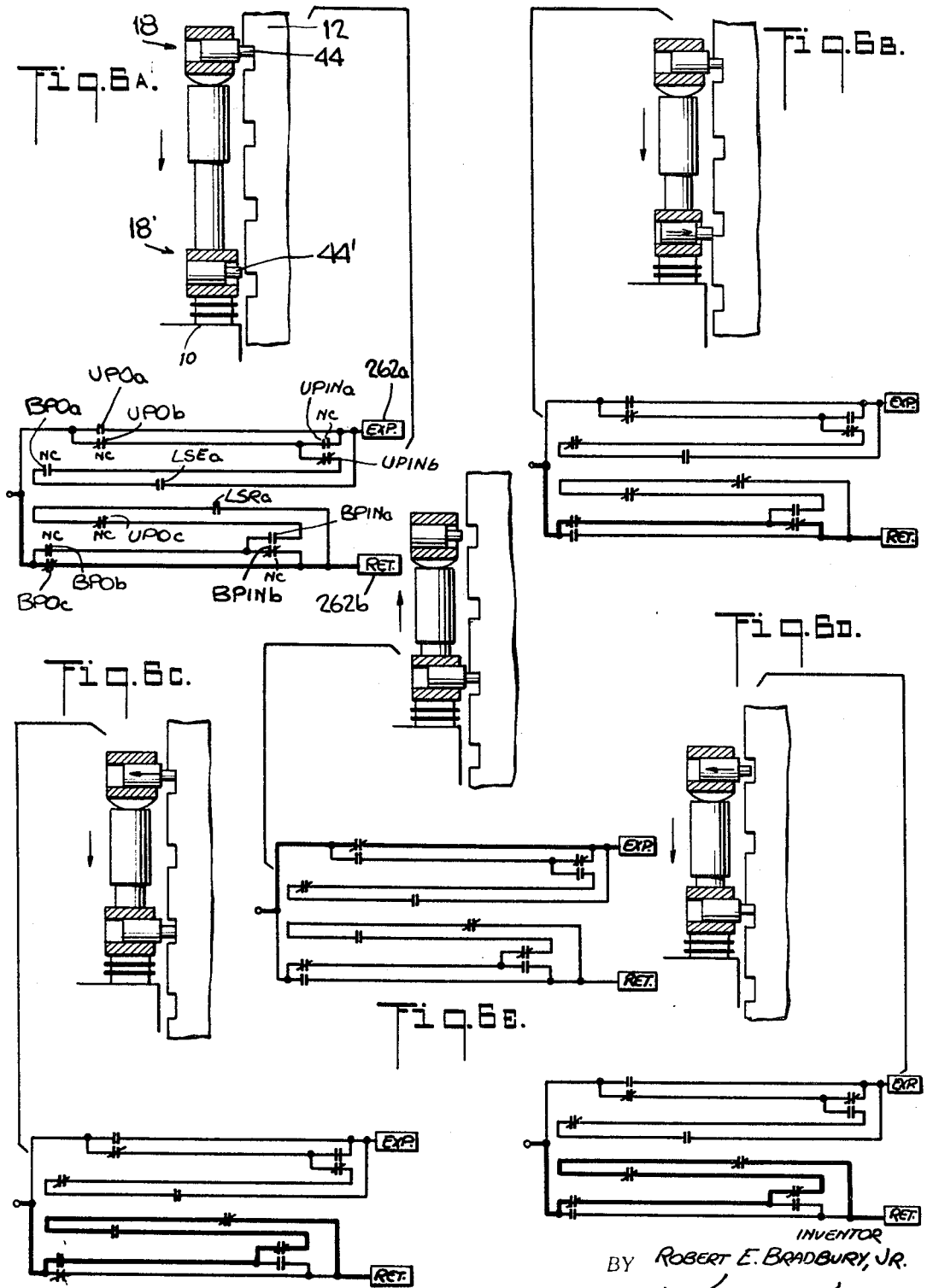

3,389,890
JACKING APPARATUS AND CONTROLS
Robert E. Bradbury, Jr., Houston, Tex., assignor to The Offshore Company, Houston, Tex., a corporation of Delaware
Filed July 1, 1966, Ser. No. 562,401
28 Claims. (Cl. 254—106)

ABSTRACT OF THE DISCLOSURE

Jacking apparatus and controls for platforms which are movable with respect to support legs, characterized by expandable and retractable upper and lower jack means adjacent each leg; stroking jack means secured between each pair of upper and lower jack means; and hydraulic and electrical means for controlling the operation of the jack means both at a central location and also adjacent each support leg.

*Disclosure of the invention*

This invention relates to a novel jacking apparatus and controls for use with platforms which are movable with respect to support legs or caissons. More particularly, this invention relates to a novel jacking apparatus and controls for use with a marine platform, such as a dock or an offshore oil well drilling barge.

Offshore oil well drilling barges and other similar marine platforms, which are buoyant and are adapted to be towed or other wise propelled to a marine site, are generally provided with a plurality of openings through which a corresponding number of supporting legs are extended. The supporting legs are sometimes lowered to the marine bottom by a series of jack assemblies which are secured to the barge and which cooperate through reciprocally mounted support pins with apertured channels on the faces of the legs. The supporting legs are also sometimes lowered into abutment with the marine bottom by jack assemblies which are secured to the platform and have reciprocally mounted friction means which frictionally engage the walls of the leg. Both the pin-type and the friction-type jack assemblies generally comprise upper and lower assemblies which alternately engage the legs and provide a stroking movement. With both types of assemblies, in addition to providing a means for lowering the legs, the platform may also be raised on the legs above the water surface or lowered on the legs to or below the water surface. In addition, the legs may be raised from the marine bottom, for example when it is desired to transport the platform to another site. Whether it is the legs or the platform that is being moved, the movement generally results from a series of strokes of the jacking assemblies.

Both in raising and lowering the platform on its legs and also in lowering the legs to or into a marine bottom or withdrawing them from a marine bottom, it is desirable that the movement be synchronized and positively monitored and controlled at all times. Undue tilting of the platform for example, would impose a disproportionately high load on the legs supporting the low corner of the platform, and might not only cause the jack assemblies to bind and become inoperative, but it might also cause serious damage to the apparatus, and might even cause collapse of the platform. Whether sets of upper and lower pin means, as referred to above and as described in U.S. Patents Nos. 2,920,870 and 2,932,486, which issued on Jan. 12, 1960, and Apr. 12, 1960, respectively, are employed to move the legs and platform with respect to each other, or whether cooperating upper and lower frictional means, as referred to above and as described in U.S. Patent No. 2,775,869 which issued on Apr. 22, 1952, or some other means is used, it is desirable that there be a central means of synchronizing and controlling the movement.

When the legs and platform are moved with respect to each other by cooperating upper and lower jack assemblies such as is disclosed in the aforementioned U.S. patents, in addition to the general considerations of synchronization and control of the legs as a group, it is desirable that the operation of the jacking assemblies at each leg also be carefully synchronized and controlled. Thus, simultaneous disengagement of both the upper and lower pins or friction means on any leg must be avoided, as otherwise either the leg or the platform would fall due to a lack of support. Further, it is desirable that expansion or contraction of the jacks which provide the strokes or movement be avoided when both the upper and lower pins or friction means are both in engagement with the leg, as otherwise the pins may tear out the apertured channels on the face of the legs or the apparatus may be otherwise damaged.

A unified, centrally controlled jacking system is also desirable from the viewpoint of efficiency and economy. For example, with a unified system, the jacking at all the legs can be monitored and controlled by one operator when this is necessary or desirable. A centrally controlled system in which much of the operation can be accomplished automatically with appropriate "fail-safe" means is especially desirable as, with such a system, the jacking can be monitored and controlled by an operator who has only a minimal amount of detailed knowledge of the system's exact operation. Capability of substantially automatic operation is especially desirable in the case of offshore platforms such as those used for drilling or for navigational aids, where a storm or other dangerous condition might unexpectedly arise at a time when the primary operator is incapacitated or unavailable. None of the control means heretofore available in the art, however, provide a unified system capable of central control by a relatively inexperienced operator.

With jacking systems such as those contemplated by this invention, it is desirable to provide means for removing a faulty pump from the system without disrupting the jacking operation which will distribute the load formerly carried by the faulty pump among other pumps in the system. It is also desirable in jacking systems such as those contemplated by this invention to minimize the number and capacity of the heat exchangers in the hydraulic system, and it is particularly desirable to provide a system which can be operated without heat exchangers long enough for the platform to be stabilized if an unexpected storm or other emergency arises.

It is one object of this invention to provide a jacking apparatus and controls which can be either wholly monitored, synchronized and controlled at a central master control, or wholly controlled at local control panels adjacent each leg.

It is another object of this invention to provide a jacking apparatus and controls which can be partially controlled at a central master control and at the same time partially controlled at local control panels adjacent one or more legs.

It is a further object of this invention to provide a jacking apparatus and controls in which simultaneous disengagement of all pins, friction means or the like connecting a leg to the platform is prevented.

It is a further object of this invention to provide a jacking apparatus and controls in which expansion or contraction of the jacks which provide strokes of movement of the platform or the legs is prevented when upper and lower pin, friction or other means are both in engagement with the leg.

It is a further object of this invention to provide a jacking apparatus and controls which can be operated by a person with a minimum amount of detailed knowledge of the system's exact operation.

It is a further object of this invention to provide a jacking apparatus and controls which will permit removal of selected hydraulic pumping means and valves from the system without disrupting the system's overall operation.

It is a further object of this invention to provide a jacking apparatus and controls in which the number and capacity of heat exchangers required for the hydraulic system is minimized, and in which the apparatus can be operated without heat exchangers long enough to stabilize the platform in the case of a storm or other emergency.

It is a further object of this invention to provide a jacking apparatus and controls which lowers the platform at a relatively low rate of speed.

It is a further object of this invention to provide a jacking apparatus and controls having desirable features of safety, efficiency, ease of operation and economy.

These and other objects and advantages of this invention will become more apparent from the following detailed description of an embodiment of this invention taken in conjunction with the accompanying drawings, in which:

FIG. 1 is a functional diagram showing the relationship and location of various members of a preferred embodiment of this invention, including side or stroking jacks, pin jacks, a local control panel and a master control console;

FIG. 2 is a detailed perspective view of the local control panel shown in FIG. 1, which panel may be employed for monitoring and controlling the pin jacks and stroking jacks for a leg at a location which is immediately adjacent to the leg;

FIG. 3 is a detailed perspective view of the master control console shown in FIG. 1, which console may be employed for monitoring and controlling both the pin jacks and the side or stroking jacks for all the legs and also other members of the jacking apparatus and controls of this invention at a central location;

FIGS. 4A and 4B comprise an electrical schematic diagram of control and monitoring circuitry in a preferred embodiment of the jacking apparatus and controls of this invention shown in FIG. 1;

FIGS. 5A and 5B comprise a partially hydraulic and partially electrical schematic diagram of control and monitoring means employed in the preferred embodiment of this invention of FIG. 4; and FIGS. 6A to 6I, inclusive, are simplified diagrammatic representations of the sequence of operation of the pin jacks, the side jacks and relay elements of the electrical control circuit of FIGS. 4A and 4B during a typical sequence of operation of this invention, namely that of the lowering of a leg from the platform.

The embodiment of the jacking apparatus and controls of the invention which is described herein is for use with a platform or marine barge 10 having four support legs 12, each leg having a pair of vertically spaced yokes 14, 14' which envelop the leg (see FIG. 1). The yokes are operatively connected to each other by a pair of telescoping hydraulic side or stroking jacks 16, each of which is secured between and to a pair of vertically aligned hydraulic pin jacks 18, 18'. Each support leg or caisson 12 passes through the platform 10 and each has a pair of elongated channel-shaped racks (not shown) secured along diametrically opposed points on the outer surface thereof. The web of each of these channel-shaped racks has a series of vertically spaced apertures which cooperate with the hydraulic pin jacks 18, 18' for mounting and moving the leg relative to the platform in a stepwise fashion upon actuation of the side or stroking jacks 16. The operation of the hydraulic pin and side jacks generally corresponds to that of the corresponding members described in the aforesaid U.S. Patents Nos. 2,920,870 and 2,932,486, and the pin jack assembly preferably corresponds to that disclosed in the copending application of Robert E. Bradbury, Jr. for Hydraulic Cylinder Apparatus filed on even date herewith.

FIG. 1 is a functional diagram showing the relationship and location of various members of the preferred embodiment of this invention. Section 20 of FIG. 1 includes members of the jacking apparatus and controls which are preferably located at jackhouses adjacent to each leg. For clarity only the jackhouse for "Leg 1" is shown, as the jackhouses for the remaining legs correspond generally to that for "Leg 1." Section 22 of FIG. 1 includes members of the jacking apparatus and controls of this invention which are preferably located at the master control station, and section 24 includes members preferably located at a central hydraulic pump room.

Included within section 20 are a pair of side or stroking hydraulic jacks 16, a pair of opposing upper hydraulic pin jacks 18 and a pair of opposing lower pin jacks 18'. Each upper pin jack 18 and each lower pin jack 18' is connected to its horizontally-opposed pin jack by a yoke, 14 and 14' respectively, each of which envelops leg 12. These yokes 14, 14' are preferably each comprised of two substantially semi-circular portions, one on either side of their respective pin jacks 18, 18' and are preferably of the type shown and described in the aforesaid copending U.S. patent application. Upper yoke 14 is connected to lower yoke 14' by means of a telescoping rod 26 which is connected to the yokes by means of universal joints 28. The inner portion 30 of rod 26 has a stroking jack limit switch 32 secured to it by means passing through a vertically extending slot 34 in the outer portion 36 of the telescoping rod. Limit switch 32 has a rotatable switching member 38 which is turned clockwise by an upper striker plate 40 on the outer portion 36 of rod 26 when jacks 16 are fully retracted, as shown in FIG. 1, and counterclockwise by a lower striker plate 42 on the outer portion 36 of rod 26 when side jacks 16 are fully expanded. Rotation of the switching member 38 upon expansion and retraction of the stroking jacks 16 closes electrical contacts within limit switch 32, the function of said contacts being more fully described below.

In FIG. 1, the pins 44 of the upper pin jacks 18 extend within pin racks (not shown) secured to the outside walls of leg 12. As mentioned above, these pin racks comprise a pair of channel-like members secured to the opposing sides of the leg in alignment with pin jacks 18 and 18'. Each channel-like member has a plurality of vertically aligned, equally spaced apertures or pin-holes for reception of pins 44, 44'. The pins 44, 44' in the lower pin jacks are shown in a retracted position out of engagement with the pin rack. Pin limit switches 46, 46' on the upper and lower pin assemblies indicate when pins 44, 44' are fully retracted or fully expanded by closing electrical contacts in a manner described in the aforesaid copending U.S. patent application. Both the pin limit switches 46, 46' and the stroking jack limit switch 32 are electrically connected to a local control panel 48 which is shown in detail in FIG. 2. A valve panel 50 is also connected to the local control panel. Local control panel 48 is operatively connected to a relay panel 51 which is in turn connected to a master control console 52 which is shown in detail in FIG. 3.

Master control console 52 has four control and monitoring panels: a function switch panel 54, a jack control panel 56, a pump control panel 58 and a gauge panel 60. The master control console is operatively connected through a junction box 61 to electric motors 62 at a central pump room which are in turn connected to a pump room control panel which serves as a junction box. Suction header vacuum switch 66, accumulator pressure switch 68 and oil temperature switch 70 illustrate hydraulic monitoring means which are connected to pump room panel 64.

The general operation and functions of the local control panel 48 and the master control console 52 will now be briefly described with particular reference to FIG. 2 and FIG. 3. FIG. 2 is a perspective view of the arrangement of a preferred local control panel and FIG. 3 is a perspective view of the arrangement of a preferred master control console.

Local control

Each leg's pin jacks 18, 18' and stroking jacks 16 can be individually controlled either at the local control panel 48 for the leg or at the master control console 52. The selection of the location of the control for a leg is made by a five-position function switch 72 at the master control console 52. Separate function switches are provided for each leg, so that the pin jacks 18, 18' and stroking jacks 16 at one or more legs may be under control of the legs' local control panels 48, while control over the pin jacks and stroking jacks for the remaining legs is retained at the master control console 52. Each function switch 72 has the positions "Lower Leg," "Raise Barge," "Lower Barge," "Raise Leg" and "Local Manual," corresponding to commands which are possible with the switch. If a function switch 72 for any leg is in any position other than "Local Manual," control over the operation of that leg is at the master control console. Further, when a function switch 72 for a leg is in its "Local Manual" position, control of that leg is "local" and "manual," i.e., the operator of the local control panel 48 has to depress a control switch both to expand or retract the side or stroking jacks 16 and also to retract or "pull" the pins 44, 44' of the upper and lower pin jacks 18, 18'. In addition, all retract motions of the side jacks 16 for the leg proceed in a "slow retract" manner as distinguished from a "fast retract" operation which is possible when control over a leg is at the master control console. The "slow retract" and "fast retract" operations are described in further detail below with reference to FIGS. 4A, 4B, 5A and 5B.

Referring to FIG. 2, when a function switch 72 for a leg is in its "Local Manual" position, the operator of the local control panel 48 for the leg may cause the side jacks 16 for that leg to either expand, stop or retract by moving the jack control lever 74 on the local control panel into a corresponding command position. The operator may also cause the pin jacks 18 to retract and thereby pull out the upper pins 44 on yoke 14, the pin jacks 18' to retract and thereby pull out the lower pins 44' on yoke 14' or both pin jacks 18, 18' to stop by turning the pin control switch 76 to a corresponding command position. Thus, when the pin control switch 76 is turned clockwise the upper pins 44 are pulled, and when it is turned counterclockwise the lower pins 44' are pulled. When switch 76 is turned in the direction to obtain the desired movement of either the upper pins 44 or the lower pins 44', control means are provided for ensuring that the other set of pins are inserted prior to actual removal of the pins. For example, turning the pin control switch 76 to its "Pull Upper Pin" position will cause the lower pins 44' to be inserted into the pin rack on the leg 12 before the upper pins 44 are actually removed. This feature of this invention ensures against all of the pins supporting a leg being simultaneously withdrawn due to an inadvertent mistake of the operator, and ensures against either the leg or the barge falling due to lack of support.

Pilot lights are provided on the local control panel 48 to enable the operator to determine the position of the side or stroking jacks 16 and the pin jacks 18, 18' for his leg at a glance, as well as to enable him to determine whether he or the operator of the master control console 52 has control over their operation. Pilot light 78 glows when the function switch 72 on the master control console for the leg is in its "Local Manual" position and control over the leg is thus at the local control panel, and pilot light 80 glows when the function switch for the leg is in any other position, for example, "Raise Barge," and control over the leg is therefore still at the master control console. Pilot lights 82 glow when the two upper pins 44 are fully inserted in the pin rack on leg 12, and pilot lights 84 glow when these pins are fully retracted and out of the pin rack. Corresponding pilot lights 82' and 84' are provided for the two lower pins 44'. Pilot lights are also provided to monitor the side jacks 16. Pilot light 86 glows when the side jacks are fully expanded, and pilot light 88 glows when the jacks 16 are fully retracted.

Each local control panel 48 also has a pushbutton switch 90 for testing the pilot lights on the panel to ascertain whether any have burned out, and a telephone jack 92 which is electrically connected to similar jacks on the master control console 52, the other local control panels, the pump room panel 64 at the central pump room and any other locations with which direct and immediate communication is desirable. Another location is called by means of a call-bell pushbutton 94 which is pressed to ring a pre-arranged signal depending upon which telephone the operator of the local control panel wishes to call. For example, one long ring might designate a call for the operator of the master control console, two long rings a call for the pump room, and so forth. The local control panel 48 is provided with a swing-down cover panel 95 for protection when the local control panel is not in use.

Master control

As mentioned above, when a function switch 72 on the master control console 52 is in any position for a given leg other than "Local Manual," there is no control over the operation of either the side jacks 16 or the pin jacks 18, 18' for this leg at the local control panel 48, the jacks being controlled solely at the master control console.

As shown in FIG. 3, the master control console is divided for the convenience of the operator into four sections: a function switch panel 54, a jack control panel 56, a pump control panel 58, and a gauge panel 60. The function switch panel includes a five-position function switch 72 for each of the legs for the barge. One of the five positions on each of the function switches is "Local Manual" which, as described earlier, transfers control over the operation of the pin and side jacks for that leg to a local control panel 48 for that leg. The other four positions are respectively "Lower Leg," "Raise Barge," "Lower Barge" and "Raise Leg," and correspond to four operations which are possible with the system of this invention. The function switch panel also includes a two-position switch 108 for each leg, each of which can be turned either to "Automatic" or to "Semi-Automatic." The purpose of this switch and the differences between "Automatic" operation and "Semi-Automatic" operation are described below.

The jack control panel 56 of the master control console includes a jack control lever switch 110 and a set of pilot lights for each leg of the barge or platform. Pilot light 112 glows when the two upper pins 44 for the leg are fully extended into the pin rack for the leg, and pilot light 114 glows when the two upper pins for the leg are fully retracted and pulled out of the pin rack. Similar pilot lights 112' and 114' are provided for the lower pins 44'. Pilot lights are also provided to monitor the side jacks 16 for the legs, with pilot lights 116 and 118 respectively glowing when the side jacks for the legs are fully retracted or fully expanded.

Additional pilot lights are provided for each leg on panel 56 to show the mode of operation which has been selected for that leg by the leg's function switch 72 and operation switch 108. Lamp 120 glows when the function switch for the leg in question has been turned to its "Local Manual" position; lamp 122 glows when the function switch for the leg is in a position other than "Local Manual" and the leg's operation switch is in its "Automatic" position; and lamp 124 glows when the function switch for the leg is in a position other than "Local Manual" and the operation switch is in its "Semi- Automatic" position. A push-button test switch 126 is provided for each leg for testing whether any of the pilot lamps for that leg on the jack control panel 56 have burned out. It is evident that the pilot lights on the jack control panel enable the operator of the master control console 52 to readily determine the position of the various jacks.

When the function switch 72 for a leg is in a position other than "Local Manual," the operation of the jacks at the leg is controlled at the master control console by positioning of the function switch 72, the operation switch 108 and the jack control lever switch 110 for the leg.

Each of the jack control levers 110 has three positions. In the middle position, all operation of the jacks is stopped. The effect of moving a jack control lever 110 to one of its other two positions depends upon the position of the function switch 72 and the operation switch 108 for the leg in question. If the operation switch is positioned on "Automatic," moving the jack control lever to its upper position causes commencement of either the "Lower Leg" or "Raise Barge" operation if the leg's function switch 72 is also positioned on either "Lower Leg" or "Raise Barge," and moving the jack control lever to its lower position causes commencement of either the "Raise Leg" or "Lower Barge" operation, if the leg's function switch is positioned on either of these operations. When switch 108 is positioned on "Automatic," the operation commanded by the leg's function switch and jack control lever proceeds automatically without any need for further commands at the master control console. The operator may monitor the operation by means of the pilot lights on the master control console, but he does not have to operate any control means until he wishes to stop the operation. A typical sequence of operation, "Lower Leg," is illustrated in FIGS. 6A–6I and described below with reference to these figures.

The "Semi-Automatic" mode of operation differs from the "Automatic" mode in that, while operation of the pin jacks 44, 44' proceeds automatically, manual control is retained by the operator of the master control console 52 over the expansion and retraction of the side or stroking jacks 16 for the leg. This control is exercised by means of the leg's jack control lever 110. When the operation switch 108 for a leg is positioned at "Semi-Automatic," moving the leg's jack control lever 102 to its lower position causes retraction of the stroking jacks, and moving it to its uper position causes expansion of the stroking jacks.

It is evident from the foregoing that, by means of the control switches on the master control console 52, the operator of the console can either transfer control over one or more legs to local control panels 48 adjacent to the leg, or he can have an operation such as the lowering or the raising of a leg proceed fully automatically, or he can have the operation of the pin jacks 18, 18' proceed automatically, and retain control at the master control console over the operation of the stroking jacks 16. There is thus a wide range of possible control modes which provide considerable flexibility of operation.

Turning now to the other control and monitoring means which are provided on the master control console, also included is a pump control panel 58 and a gauge panel 60. Panel 58 has a four-position selector switch 130 for each leg for controlling the operation of a hydraulic pump 132, preferably vane-type pumps (see FIGS. 5A and 5B), which supplies the jacks at the leg. The four positions on the selector switches 130 are "Off," "From Header Only," "To Leg Only" and "To Leg and Header," and correspond to various operations which are possible with the switch's pump 132. For example, the pump can be turned off, or made to supply only the jacks at its leg, or made to supply both the jacks at its leg and also a hydraulic header conduit 140 (see FIGS. 5A and 5B) by corresponding positioning of the pump's switch 130. Panel 58 also has a three-position selector switch 134 for controlling the operation of each of two high pressure pumps 136 (see FIGS. 5A and 5B) which are not assigned to any one leg.

The three positions of each switch 134 are "Off," "Preload" and "Charge Accumulator Only." When a switch 134 is positioned on "Off," the pump 136 to which the switch is assigned is de-energized. When a switch 134 is positioned on "Preload," the pump 136 supplies high pressure through a header line 140 to assist in driving a leg to refusal in the marine bottom. When the switch is positioned on "Charge Accumulator Only," the pump 136 is assigned to maintain supply pressure to a hydraulic accumulator 138 (see FIG. 5B).

By means of selector switches 130, any one pump 132 can either be shut down or can be assigned to supply either only its own leg or the jacks 16, 18, 18' and hydraulic apparatus at all four legs of the barge. Thus, if one vane pump 132 needs repair it can be shut down and its leg can be supplied by the remaining vane pumps by turning its switch 130 to "From Header" and the remaining switches 130 to "Leg and Header." Similarly, by means of selector switches 134, one of the two piston pumps 136 may be shut down for repair and its load transferred to the other piston pump, by turning its switch 134 to "Off" and switch 134 for the other piston pump either to "Preload" or "Charge Accumulator Only" depending on what function the piston pump is to fulfill. When a vane pump selector switch 130 for a leg is switched to its "From Header" position, and either or both piston pump selector switches 134 is placed in its "Preload" position, hydraulic fluid under high pressure is supplied to the jacking means at the leg to assist in driving the leg to refusal in the marine bottom.

The pump control panel includes pilot lights 142 and 144 which glow respectively when the hydraulic fluid preferably oil, is below or above a predetermined safe operating temperature. Lights 142 and 144 thereby warn the operator of the master control console when there may be trouble in the hydraulic system due, for example, to a faulty heat exchanger or due to an overload. In addition, a set of three pilot lamps 146, 148 and 150 respectively indicate when the pressure in the hydraulic accumulator 138 (see FIGS. 5A and 5B) is below, within or above a desired pressure range. This provides a means of monitoring the pilot pressure being supplied to various hydraulic means. The pump control panel also includes a pilot light 152 for each of the vane pumps 132 as well as a pilot light 154 for each of the piston pumps 136, which glow when their respective pumps are operating. When their selective switches 134 are positioned on "Charge Accumulator Only," piston pumps 136 come on and their pilot lights 154 are lit only when the pressure in the accumulator falls below a predetermined value, and both the pumps and their pilot lights are automatically shut off when the pressure is raised to above a predetermined value.

The master control console shown in FIG. 3 also includes a telephone jack 156 and a call-bell pushbutton 158 similar to that described above with reference to local control panel 48, as well as a test pushbutton 160 for testing the pilot lights on the pump control panel. Finally provided is a gauge panel 106 on which are mounted pressure, temperature or other gauges operatively connected to points in the system which it is desired to monitor. For example, it is desirable that the gauge panel include pressure gauges which measure the pressure in both the pushing or "ram" side and also the pulling or "rod" side of the stroking jacks 16 at each of the legs.

By means of the control means provided on the pump control panel 58, the operator of the master control console can thus monitor the operation of the various pumps which supply hydraulic fluid to the jacks and the hydraulic system. In addition, by means of control switches 130 and 134, he can remove a faulty vane pump 132 from the system and operate the jacks at all four legs with the three remaining vane pumps 132. Also, only two pumps 136 are required to supply higher pressure to the system when such pressure is needed, and either of the two pumps 136 can be removed from the system when desired and its load transferred to the other pump. The consequent advantage in flexibility is apparent. Further, by limiting the number of high pressure pumps to two instead of using four, or one for each leg, there is also considerable savings in cost.

*Description of hydraulic and electrical systems*

In the following, first the electrical control and monitoring circuitry shown in FIGS. 4A and 4B will be briefly described, then the cooperating hydraulic system shown in FIGS. 5A and 5B will be discussed, and then typical illustrative operations of the jacking apparatus and controls of this invention will be described with reference to FIGS. 4A, 4B, 5A and 5B.

FIGS. 4A and 4B comprise a detailed schematic diagram of electrical control and monitoring circuitry for one of the four support legs in a preferred embodiment of this invention. This figure includes legends generally denoting the preferred physical location of the various circuit elements. Thus, function switch 72, operation switch 108, test switch 126, jack control lever switch 110, pump control relay 202 and pilot lights 112, 112′, 114, 114′, 116, 118, 120, 122 and 124 are located at the master control console 52; electrical relays BPO, UPO, LSE, LSR, BPI$n$, UPI$n$, PE and PR, and their respective relay contacts BPO$a$, $b$, $c$ and $d$, UPO$a$, $b$, $c$ and $d$, LSE$a$, $b$, $c$ and $d$, LSR$a$, $b$, and $c$, BPI$na$, $b$, $c$, and $d$, UPI$na$, $b$, $c$ and $d$, PE$a$ and $b$, and PR$a$ and $b$ are located at relay panel 51; jack control switch 74, pin control switch 76, test switch 90 and pilot lights 78, 80, 82, 82′, 84, 84′, 86 and 88 are located at local control panel 48; and hydraulic valve solenoids 262$a$, 262$b$, 266A and 180A, and pressure switch 170 are located at valve panel 50. It might be pointed out, however, that upper pin limit switch contacts 46$a$, $b$, $c$, $d$, $e$, $f$, $g$, $h$, $i$ and $j$ lower pin limit switch contacts 46′$a$, $b$, $c$, $d$, $e$, $f$, $g$, $h$, $i$ and $j$, and stroking jack limit switch contacts 32$a$, $b$, $c$, $d$, $e$, $f$, $g$ and $h$ are located at the jacks for the leg although shown in FIG. 4B under legends denoting a location in the local or valve panels. Contacts which are normally-closed are shown with a diagonal line passing through the contacts. All others are normally open.

For clarity, function switch 72 is shown schematically in FIG. 4. The function switch's five command positions appear across the top rows of the switch contacts, "LL" representing the command of "Lower Leg"; "RB" representing "Raise Barge"; "LB" representing "Lower Barge"; "RL" representing "Raise Leg"; and "LOC/MAN" representing "Local Manual." An "X" in a vertically aligned box below a particular command position of the function switch indicates that, when function switch 72 is in that command position, the circuit is closed across that particular contact of the function switch. For example, the circuit is completed across row of contacts 72$a$ of function switch 72 when the switch is either in the "Lower Leg" or "Raise Barge" position, but not in any other position.

To further simpify FIGS. 4A and 4B for purposes of clarity, a similar convention is used with respect to operation switch 108.

Operation switch 108 has six rows of contacts 108$a$, $b$, $c$, $d$, $e$ and $f$. Three rows of contacts 108$b$, $c$ and $e$ are closed only when switch 108 is in its "Automatic" position, and three rows 108$a$, $d$ and $f$ are closed only when the switch is in its "Semi-Automatic" position. Pin control switch 76 is shown schematically in FIG. 4B as a double pole, three position switch. In the "Full Upper Pin" position of switch 76, relay coil 170A is connected to function switch contacts 72$j$ by switch contact 76$a$ and contact 76$b$ breaks electrical connection to coil 170B. In the "Pull Bottom Pin" position of switch 76, contact 76$a$ breaks electrical connection to coil 170A and contact 76$b$ connects coil 170B to function switch contacts 72$j$. In the "Stop" position of the switch, contact 76$a$ connects coil 170B to stroking jack limit switch contacts 32$e$ and 32$g$ and contacts 76$b$ connects coil 170A to stroking jack limit switch contacts 32$f$ and 32$h$. Function switch 72 has twenty-four rows of contacts 72$a$, $b$, $c$, $d$, $e$, $f$, $g$, $h$, $i$, $j$, $k$, $l$, $m$, $n$, $o$, $p$, $q$, $r$, $s$, $t$, $u$, $v$, $w$ and $x$.

Also shown in FIG. 4B is an electrically tripped, mechanically held relay 170 which has two relay coils 170A and 170B, the first of which has contacts 170A–$a$ and the second of which has contacts 170B–$a$ which are closed only when their respective coils are energized, and which remain closed until the other coil is energized. Relay 170 may be for example, a 110 volt, 60 cycle, relay such as a Cutler-Hammer Catalog No. H1091, Type DM, electrical-trip, mechanically-held multi-pole relay which has three normally-open contacts and three normally-closed contacts. Relay 170 is responsive to the relay coil 170A, 170B which was last energized, and it mechanically "latches" or holds the normally-open contacts for the coil 170A, 170B last energized closed until the other coil is energized, at which time its normally-open contacts close and the contacts of the other coil open. Often the relay coils used in this type relay are intended for intermittent service only and the manufacturer provides auxiliary contact arrangements to automatically de-energize either coil after it has operated. For simplicity these contacts are not shown in FIGURE 4B since they do not affect the function of the relay. When it is relay coil 170A which was last tripped, line voltage $L_1$ is provided to the "Pull Upper Pin" solenoid 246A and the "Pull Bottom Pin" solenoid 248A is de-energized. De-energizing solenoid 248A causes a "Pull Bottom Pins" valve 248 (see FIG. 5B) to direct fluid pressure to lower pin jacks 18′ causing its pins to try to enter the support leg for the platform. Energizing solenoid 248A causes a "Pull Upper Pins" valve 246 to direct fluid pressure to upper pin jack 18 so as to pull the upper pins. Solenoid 248A cannot, however, be energized until lower pin limit switch contacts 46′$i$ and 46′$j$ are closed by the bottom pins becoming completely inserted, which completes the $L_2$ side of the electrical circuit. Energizing relay coil 170B will cause valves 246 and 248 to operate in a reverse manner to that described with reference to coil 170A.

The operation and cooperation of the various elements shown in FIGS 4A and 4B are further described below with reference to various specific operations of the jack apparatus and controls of this invention. FIGS. 5A and 5B which comprise a detailed schematic diagram of hydraulic members which cooperate with the electrical control and monitoring circuitry of FIGS. 4A and 4B will now be considered. FIGS. 5A and 5B are marked with appropriate legends denoting the members of the hydraulic system shown in the figure which would preferably be located at a central pump room, and those which would preferably be located at the jackhouse for each leg. Only the components at the jackhouse for "Leg 1" are shown; the components at the jackhouses for the remaining legs of the apparatus would correspond to those shown for the "Leg 1" jackhouse.

Two high-pressure pumps 136, preferably piston-type pumps, are connected by gear couplings 180 to two of four electric motors 62 in the central pump room section of FIG. 5A. These four motors 62 are in turn connected by gear couplings 182 to four lower pressure, high volume pumps 132, preferably vane-type pumps. Each vane pump 132 is connected through a check valve 184 to a sequence valve 186 located at the jackhouse. Sequence valve 186 blocks fluid flow to a four-way valve 260 until a pilot pressure accumulator 138 is charged to the minimum pilot pressure necessary to satisfactorily operate pin jacks 18, 18′ and pilot operated blocking valves 188 at the ram sides 190 of the side or stroking jacks 16. Valve 186 is set for example at about 1100 p.s.i.

A pilot operated, blocking check valve 192 having a pressure gauge 194 connected to it through a valve 196, is connected to the hydraulic line extending between each check valve 184 and the sequence valve 186. Blocking valve 192 allows pump 132 on its respective leg line to feed a header line 140 when the pilot section of the valve is vented to a tank 216. When the solenoid of valve 200 is energized, the pilot section of valve 192 is under pressure, causing valve 192 to open and thereby permitting the valve's leg line to receive fluid from header line 140. When de-energized, solenoid valve 202 vents control fluid from relief valve 228 to tank 216, which allows valve 228 to open so that the discharge of pump 132 is routed directly to tank at very low pressure. When pump 132 is required to supply fluid under pressure, valve 202 is energized, blocking the vent port of valve 228 which then will not allow fluid to return to reservoir 216 unless the pressure reaches the setting of relief valve 228, for example 2000 p.s.i. Solenoid valves 200 and fourway single solenoid valves 202 are electrically energized when the jack control lever 74 on the local control panel or the jack control lever 110 on the master control console is in either its "Expand" or its "Retract" portion. Jack control lever 74 energizes the solenoids of valves 200 and 202 only when the function switch 72 for the leg is in its "Local Manual" position. When the function switch is in this position, moving the jack control level 110 on the master control console has no effect on these solenoids.

Relays PE and PR isolate the expand solenoid 262a and the retract solenoid 262b from the pump control relay 202 by means of their respective contacts PEb and PRb, and thereby isolate any electrical shorts which might occur in the pumps controlled by pump control relay 202. In this way if a vane pump 132 at one of the legs is shorted out, the system can still operate.

When pump control relay 202 is energized by the closing of either normally-open relay contacts PEb or normally-open relay contacts PRb, contacts on the pump control relay 202 will energize one or more of the relief valve solenoids 202A adjacent to the vane pumps 132 (See FIG. 5A) and/or the check valve solenoid 200, to allow fluid from the header line 140 to enter the leg line, depending upon the positions of selector switches 130 and 134 on the pump control panel 58 of the master control console. Through auxiliary switches and relays, contacts on the pump control relay 202 and the selector switches 130 and 134 on the pump control panel 58 control the pumps 132 and 136 so that any pump can be used to supply any leg.

A separate pump control relay 202 may be provided for each pump, such that energizing either the expand solenoid 262a or the retract solenoid 262b for a given leg will also energize either relay PE or relay PR, respectively, which in turn will energize the pump control relay 202 for the leg in question. Assignment of the various pumps is preferably obtained by having their valve control solenoids 202A and 242 responsive to the various pump control relays 202 as well as to an auxiliary "Header Relay" (not shown) and an auxiliary "Charge Accumulator Relay" (not shown) which are further described below.

When a given leg's pump control switch 130 on the pump control panel 58 is positioned on "Leg Only," the control solenoid 202A for the vane pump 132 which is hydraulically connected to that leg is electrically connected to the contacts of the given leg's pump control relay 202. Thus, for example energizing the expand (retract) relay 262a (262b) of Leg 1 also energizes the PE (PR) relay of Leg 1, which, by way of contact PEa (PRa), energizes pump control relay 202. The pump control relay 202 closes a contact (not shown) which in turn, via pump control switch 130, energizes the control solenoid 202A of the vane pump 132 hydraulically connected to the jacks of Leg 1. Relief valve 228 is thus closed, forcing the vane pump 132 to pump up through its check valve 184 into the supply line of Leg 1.

When a given leg's pump control switch 130 on the pump control panel 58 is positioned on "From Header," the control solenoid 202A for the vane pump 132 hydraulically connected to the leg in question is completely disconnected, and instead the coil of the said header relay is connected to the normally open contacts of the pump control relay 202 for the leg in question. The control solenoid 200 for the pilot operated check valve 192 is also electrically connected through switch 130 to another normally open contact of the pump control relay 202 for the leg in question. Energizing the expand (retract) solenoid 262a (262b) of Leg 1, for example, will not effect the control solenoid 202A of Leg 1's vane pump 132, but will energize relay PE (PR), thereby closing normally open relay contacts PEb (PRb) and energizing Leg 1's pump control relay coil 202A. This in turn will close normally open contacts which energize control solenoid 200 and the coil of the header relay (not shown). Pilot operated check valve 192 is thus opened by pilot fluid from valve 242, allowing fluid pressure from the header relay (not shown). Pilot operated check valve 192 is thus opened by pilot fluid from valve 242, allowing fluid pressure from the header conduit 140 to enter the supply line for Leg 1. To insure availability of fluid pressure to the header conduit 140, the pump control switch 130 for one other leg must also be in the "Leg and Header" position, or a pump control switch 134 must be positioned in "Preload" as described below.

When a leg's pump control switch 130 is in the "Leg and Header" position, the control solenoid 202A of the leg in question is electrically connected to the pump control relay 202 contacts in the same way as when the pump control switch 130 is positioned on "Leg Only." In addition, solenoid 202A is also connected to normally open contacts of the header relay (not shown). The control solenoid 200A for the leg is completely disconnected. Thus, for example, if the pump control switch 130 for Leg 1 is on its "Leg and Header" position, energizing the Leg 1 expand (retract) solenoid 262a (262b) will energize Leg 1's PE (PR) relay, and in turn contact PEb (PRb) will energize control solenoid 202A of the vane pump 132 which is hydraulically connected to Leg 1. Thus relief valve 228 will close, forcing fluid from pump 132 through check valve 184 to Leg 1 and also through check valve 192 into the header conduit 140. The fluid forced into the header conduit 140 will charge the accumulators 138, and then all fluid will go through check valve 184 to Leg 1. If the pump control switch 130 for Leg 4 is on its "From Header" position, energizing the expand (retract) solenoid 262a (262b) for Leg 4 will energize the header relay as described above, and the header relay contacts connected to Leg 1's control solenoid 202A will energize solenoid 202A. Thus, energizing the expand or retract solenoid 262a, 262b of Leg 4 will energize Leg 1's control solenoid 202A, closing its relief valve 228 and thereby forcing the vane pump 132 for Leg 1 to supply fluid pressure to the header conduit 140 through Leg 1's pilot operated check valve 192, and thence through the pilot operated check valve 192 for Leg 4 to the hydraulic line supplying Leg 4. If the expand (retract) solenoid 262a (262b) for Leg 1 is also energized, Leg 1 and Leg 4 will share the fluid output of the vane pump 132 for Leg 1; if not all fluid will go to Leg 4.

When a piston pump's control switch 134 is positioned on "Preload," its control solenoid 242 is electrically connected to a normally open header relay contact so that energizing, for example, the expand (retract) solenoid 262a (262b) for Leg 4 will also energize the header relay coil, thus closing the contacts of the header relay coil which energize the control solenoid 242. This in turn closes piston pump relief valve 240, forcing the piston pump 136 in question to supply fluid to the header conduit 140 through check valve 274, and thence to the hydraulic supply line for Leg 4 through the pilot operated check valve 192 of Leg 4, which is also open as described above.

It is seen that the system is not dependent on the operation of all pumps 132 or 136 or of all control solenoids 202A or 242, or of all relief valves 228 or 240, and that, if necessary, any one operable pump can supply fluid to all leg's jacking apparatus.

Placing the pump control switch 130 on the pump control panel for any pump 132 in its "Off" position will disconnect all electrical connections to the corresponding vane pump control solenoid 202A.

Placing the control switch 134 for any pump 136 in its "Off" position will completely disconnect that piston pump's control solenoid 242. Place the control switch 134 for a pump 136 at the "Charge Accumulator Only" position electrically connects the corresponding solenoid 242 to the normally open contacts of an auxiliary "Charge Accumulator Relay" mentioned above the coil of which is controlled by the contacts of pressure switch 208. When pressure in the accumulator 138 falls below a predetermined value, say 1500 p.s.i., contacts of the pressure switch 208 close, energizing the coil of the charge accumulator relay which, via a normally open relay contact, shunts the pressure switch contact and "locks" itself in. The control solenoid 242 in question is then energized, closing relief valve 240, and thereby forcing the output of piston pump 136 through check valve 274 into the header conduit 140, and thence through pressure reducing valve 206 into the accumulator 138. When the accumulator pressure rises to a predetermined value, say 2500 p.s.i., additional contacts of pressure switch 208 open, thereby de-energizing the coil of the charge accumulator relay, which in turn opens the contacts of this relay connected to solenoid 242. This opens the relief valve 240 and allows piston pump output to return directly to tank 216. Thus it is seen that the piston pumps 136 can serve two purposes: (1) provide high pressure fluid to "Preload" the legs or drive them to refusal in the sea bottom, and (2) insure sufficient pilot pressure by intermittently charging the accumulator 138, which keeps the sequence valves 186 open and prevents heat generation as described below.

Each blocking valve 192 is hydraulically connected to header line 140. Header line 140 extends through a check valve 204 to a pressure reducing valve 206 which has an adjustable pressure range of for example 1000 to 3000 p.s.i. Valve 206 serves to limit pressure in accumulator 138 to its setting of for example 2700 p.s.i., and also to throttle all flow to the accumulator, thereby reducing hydraulic shock in the accumulator. A pressure switch 208, pressure gauges 210 and 212, and a second pressure reducing valve 206' are hydraulically connected to the accumulator 138. Pressure gauge 212 monitors the pilot pressure supplied to the legs by accumulator 138, and pressure gauge 210 monitors the pressure in the accumulator. Pressure switch 208 preferably comprises a "Bourdon" or curved tube which contains fluid under pressure. As pressure increases, the tube deforms and trips an electrical switch.

Vane pumps 132 are hydraulically connected through filters 214 to hydraulic reservoir 216 which stores the hydraulic fluid, preferably oil, employed in the system of FIG. 5. A vacuum switch 218, temperature switch 220, thermometer 222 and valve 224 are provided in this conduit, and a centrifugal pump 213 having a pressure gauge 215 is operatively connected to reservoir 216 through valves 217 and 219. Vane pumps 132 are also connected to a heat exchanger 226 through a relief valve 228 and a valve 230. Heat exchanger 226 is provided with a salt water supply through a line having valve 225, the salt water draining back to its supply through valve 227. Vane pumps 132 are connected to hydraulic reservoir 216 through valve 232 and a check valve 234 and also through a pop-off valve 236. Valves 224, 230 and 232 and check valve 234 are provided to prevent excessive fluid loss when performing maintenance on for example filters 214 or heat exchanger 226 which are located below the elevation of the reservoir. Pop-off valve 236 is a spring-type relief valve in which the poppet is held down by a spring on the valve's upper or tank side. Should valves 230 and 232 be inadvertently closed when the system is started, pop-off valve 236 allows fluid to return to the tank 216, thereby preventing damaging high pressures in the connective piping.

The hydraulic reservoir is hydraulically coupled to the two high pressure piston pumps 136 through valve 224 and filters 238, and through relief valve 240 having solenoids 242. A drain-line runs to the hydraulic reservoir 216 from a four-way, single solenoid valve 244, and a return line from four-way, single solenoid valves 246 and 248, pilot check valve 250 and a needle-type throttling valve 252 as the jackhouse. "Pull Upper Pins" valve 246 and "Pull Bottom Pins" valve 248 serve as controls for the upper and lower pin jacks 18 and 18'. When one of these valves is electrically de-energized, fluid passes through the valves to the "Expand" port 254 of the pin jack with which the valve is coupled, forcing the pin jack to expand and causing its pin 44 or 44' to enter the leg. When one of these valves is electrically energized, it reverses its function and directs fluid to the "Retract" port 256 of the pin jack with which it is coupled, pulling the pins 44 or 44' out of engagement with the leg. As mentioned above, the upper pin solenoid of double solenoid valves 246 and 248 cannot be energized to pull the upper pin 44 until the lower pins 44' are fully expanded and in engagement with the leg, and vice versa.

Check valve 250 when opened will allow as fast a return of hydraulic fluid from the jacks at the leg to hydraulic reservoir 216 as possible. When closed, it forces the returning fluid to flow through throttling valve 252. Valve 250 is always closed when retracting the stroking jacks 16 in a "Lower Barge" operation controlled by the master control console 52, and is also always closed when control over the operation of the stroking jacks 16 is at the local control console 48 for the leg. The "Fast Retract" and "Slow Retract" operations provided by check valve 250 and throttling valve 252 are further described below. Throttling valve 252 is preferably an adjustable, needle-type valve which may be adjusted to provide the desired rate of flow through it. It serves to control the rate of fall of the barge in a "Lower Barge" operation and also to throttle hydraulic fluid returning to the reservoir 216 at the end of each retract stroke of stroking jacks 16, thus slowing the jacks down sufficiently to allow time for the pins 44, 44' on pin jacks 18, 18' on the leg to engage or disengage from the leg. It also serves to provide a "Slow Retract" of the stroking jacks 16 whenever the operation of these jacks is being controlled at the local control panel 48 for the leg. Check valve 250 with which throttling valve 252 cooperates, is a pilot operated valve controlled by "Fast Retract" solenoid valve 244. When solenoid 180A of valve 244 is de-energized (see FIG. 4B) it allows the pilot pressure in valve 250 to drain to the hydraulic reservoir 216, closing valve 250. When solenoid 180A is energized, it allows pilot pressure to be supplied to check valve 250, causing it to open, thereby providing a bypass for throttling valve 252 and permitting a "Fast Retract."

Check valve 250 and throttling valve 252 are connected to a four-way double solenoid valve 260 having a choke block. Valve 260 is located at the valve panel 50 at the jackhouse for the leg, and serves as a control valve for the cylinder of stroking jacks 16. One or the other of its solenoids 262a or 262b will be energized depending upon whether the jack control lever 102 (in master control) or 74 (in local control) is positioned on "Expand" or on "Retract." Depending on which solenoid is energized, four-way valve 260 will direct fluid either to the ram sides 190 or the rod sides 190' of the stroking jacks. If the respective jack control level 102 or 74 is in the "Off" position, entrance to the ram sides 190 of the stroking jacks is blocked and the fluid within the ram sides is trapped therein, and the fluid in the rod sides 190' drains to the hydraulic reservoir 216, opening pressure switch 264, which in turn de-energizes the solenoid 266 for solenoid pilot valves 188. This causes the pressure in the pilot sections of valves 188 to also vent to the hydraulic reservoir 216. The trapping of fluid within the ram sides 190 of the stroking jacks 16 prevents a collapse of these jacks.

Pressure gauges 268 and 270 are provided at gauge panel 60 to monitor the pressure in the hydraulic lines running to the ram side 190 and the rod side 190' of the stroking jacks. As mentioned, solenoid pilot-operated blocking check valves 188 are provided at the ram side 190 of the stroking jacks, and a four-way, single solenoid valve 266 is electrically connected to a pressure switch 264 hydraulically connected to the line between a relief valve 270 and four-way double solenoid valve 260.

In addition to the functions of pilot operated blocking check valves 188 referred to above, these valves also serve to close the hydraulic ports at the ram side 190 of stroking jacks 16 if there is a leak in a hydraulic hose or other conduit in the hydraulic line between rod port 190' and four-way valve 260, relieving pressure at pressure switch 264 and thereby de-energizing solenoid 266.

Relief valves 228, 240 and 270 preferably have adjustable ranges of, for example, 100–3200 p.s.i. Relief valves 228 at the pressure sides of the vane pumps 132 are set at for example 2000 p.s.i., and serve to limit the output of the vane pumps to that required to lift the dead weight of the barge. Relief valves 240 at the pressure sides of the higher pressure piston pumps 136 are set at for example 3200 p.s.i., and serve to limit the output of the piston pumps to that required to "Preload" the legs of the barge. Relief valve 270 serves to limit the maximum pressure supplied to the rod side 190' of the stroking jacks 16 to just above that required to retract the jacks' cylinders under no load at "Fast Retract." This is a heat-saving measure since, when lowering the barge with the vane pumps 132 for the leg operatively connected to the rod side 190' of the stroking jacks 16, the rod side of the stroking jacks can utilize only about half of the capacity of the vane pump. Relief valve 270 allows fluid to bypass at a pressure lower than the bypass setting of the pump's relief valve 228, resulting in less heat being built up in the hydraulic line. In this way a heat exchanger 226 with a lower capacity can be utilized than would otherwise be required.

Pressure reducing valve 206' connected to the accumulator 138 serves to limit the accumulator discharge pressure to a predetermined value of, for example, 1500 p.s.i., thereby protecting the hydraulic lines and valves downstream from pressure reducing valve 206'.

Further illustrative operations of the hydraulic system of FIGS. 5A and 5B will now be considered. In normal operation, energizing solenoid 202A for "Leg 1," for example, closes the solenoid operated relief valve 228 for the vane pump 132 for "Leg 1" forcing the vane pump to supply hydraulic fluid to Leg 1 through check valve 184 and sequence valve 186 if pilot pressure is equal to or greater than the setting of valve 186. If pilot pressure is below the setting of valve 186, this valve will close, forcing fluid into accumulator 138 through pilot operated check valve 192 until the accumulator 138 is sufficiently charged to provide pilot pressure equal to the setting of sequence valve 186. Valve 186 will then open, allowing fluid to four-way valve 260. In normal use pilot pressure is sufficient to hold sequence valve 186 open since the accumulators 138 are kept charged by piston pumps 136 as described below. Should accumulator or piston pump failure occur, however, sequence valve 186 insures proper pin operation as long as any pump is available to jack its leg.

When the pressure in the accumulator 138 falls below a predetermined value, for example 1500 p.s.i., pressure switch 208 energizes solenoids 242 which close the solenoid operated relief valves 240 for the two piston pumps 136. These piston pumps then supply fluid to the header line 140 through check valves 274, and from the header line to accumulator 138 through check valve 204 and pressure relief valve 206. When the accumulator pressure rises to a predetermined value, for example 2500 p.s.i., solenoids 242 are de-energized by pressure switch 208, and the relief valves 240 for the two piston pumps 136 are automatically opened. Pressure switch 208 thus cooperates with the solenoid operated relief valves 240 at the piston pumps 136 to automatically maintain the pressure in the accumulator above a predetermined level. Pressure reducing valve 206 is provided to limit the maximum pressure of the fluid being supplied to the accumulator to a predetermined value, for example, 2700 p.s.i.

If a vane pump 132 for a leg, for example the vane pump for Leg 4, breaks down or has to be taken out of the system for maintenance, the pressure relief valve 228 for one or more of the other vane pumps 132 is energized and closed, and the pilot operated check valve 192 for Leg 4 is also energized and opened. This allows the other vane pump or pumps to supply the required fluid to Leg 4, and also to charge the accumulator 138 to the pressure required by Leg 4. For example, if it is desired to use only the Leg 2 vane pump 132 to supply Leg 4, fluid will flow through the check valve 184 and the pilot operated check valve 192 for Leg 2 into the header line 140, and from the header line through the pilot operated check valve 192 for Leg 4 to Leg 4. This redistribution of the load for a given vane pump 132 is controlled by switches 130 on the pump control panel 58 of the master control console.

When it is desired to "Preload" one of the legs, for example Leg 4, the solenoid 242 for the solenoid operated relief valve 240 on one or more of the two piston pumps 136 is energized and valve 240 thereby closed, and the solenoid 200 for the pilot operated check valve 192 for the leg to be preloaded, Leg 4 in this example, is simultaneously energized, and valve 192 thereby opened. If the relief valve 240 for only one of the two piston pumps 136 is energized fluid under high pressure will flow from this piston pump through its check valve 274, header line 140 and the pilot operated check valve 192 for Leg 4 to Leg 4. Accumulator 138 will simultaneously charge to the maximum setting of pressure reducing valve 206', for example 2700 p.s.i. This "Preload" operation is directed and controlled by switches 130 and 134 on the pump control panel 58 of the master control console, and is utilized when it is desired to "Preload" a leg, i.e., drive it to refusal in the marine bottom.

*Expansion and retraction of the stroking jacks*

When it is desired to have the stroking jacks 16 for a given leg expand, the system of the preferred embodiment of this invention generally operates as follows. If the function switch 72 on the master control panel 52 for the leg is positioned at "Local Manual," and the system is thus in local manual control with respect to the leg in question, the jack control lever 74 on the local control panel 48 is moved to its "Expand" position. If the leg in question, Leg 1 for example, is under control of the master control console 52, the jack control lever 110 for that leg on the jack control panel 56 of the master control console is moved to its "Expand" position. This positioning of jack control lever 74 or 110 energizes solenoid 262a of four-way, double solenoid valve 262 as well as solenoid 202 for the relief valve 228 for the vane pump for Leg 1. When energized, relief valve solenoid 202 closes the relief valve 228 for the vane pump for Leg 1 and forces the Leg 1 pump 132 to pump up through check valve 184 to the sequence valve 186 at Leg 1. If pilot pressure is below the setting of valve 186, this vane pump 132 charges accumulators 138. When the accumulators are charged to a predetermined pressure, for example 1100 p.s.i., sequence valve 186 opens. As mentioned, turning the jack control lever 74, 110 to its "Expand" position also energizes the expand solenoid 262a of four-way double solenoid valve 262 (see FIG. 4). This permits fluid coming from the sequence valve to flow through valve 260 to the blocking valves 188 at the ram side 190 of the stroking jacks. The fluid pressure opens blocking valve 188 and the fluid enters the ram side of the cylinders of stroking jacks 16 causing the jacks to expand. The fluid in the rod side 190′ of the stroking jacks passes through valve 260, pilot check valve 250, and throttling valve 252 to the hydraulic reservoir 216.

When it is desired to stop the stroking jacks 16 the system of the preferred embodiment of this invention generally operates as follows. If the system is in local manual control with respect to the leg in question, the jack control lever 74 on the local control panel 48 is moved to its center or "stop" position. If the leg in question, for example Leg 1, is under control of the master control console then the jack control lever 110 for that leg on the jack control panel 56 of the master control console is moved to its center or "stop" position. This position of the jack control lever 74 or 110 de-energizes solenoid 202 opening the relief valve 228 for the vane pump 132 for Leg 1. This allows the output of this vane pump to return directly to the hydraulic reservoir 216 through pop-off valve 236 and check valve 234. This position of the jack control lever 74 or 110 also de-energizes expand and retract solenoids 262b and 262a, allowing the four-way, double solenoid valve 260 to center and assume the position shown in FIG. 4A, thereby permitting the fluid at the rod sides 190′ of the stroking jacks to bleed through valve 260 and valve 252 to the hydraulic reservoir 216; simultaneously, the connection from valve 260 to valve 188 is closed. Should a fluid connection between four-way valve 260 and blocking valve 188 fail, it will cause these blocking valves to close and trap fluid within the ram side of the jacks. This prevents a collapse of the stroking jacks 16 when the stroking jacks are stopped.

*Fast and slow retract modes of operation*

Depending upon the operation being undertaken and depending also upon whether the operation is under the control of the master control console 52 or the local control panel 48, the stroking jacks 16 will retract either in a "Fast Retract" mode or a "Slow Retract" mode.

The "Fast Retract" mode of operation of the stroking jacks 16 occurs when the jacks for a leg are in other than local manual control and when the operation being undertaken is other than "Lower Barge." Thus, there is no "Fast Retract" when function switch 72 is positioned either at "Local Manual" or at "Lower Barge," but this mode of operation automatically occurs with the hydraulic and electrical system of this invention when the function switch 72 for a leg is in any other position, whether the operation switch 108 is positioned on "Automatic" or on "Semi-Automatic."

Assuming operation switch 108 is positioned on "Automatic" and function switch 72 is positioned on either "Raise Barge" or "Raise Leg," when the jack control lever 102 is positioned on "Retract," the "Fast Retract" operation generally proceeds as follows. If the upper pins 44 are fully expanded and the lower pins 44′ are fully retracted, then normally-open contacts 46e and 46f of the upper pin limit switches 46 will be closed, energizing relay coil UPI$n$. If the upper pins 44 are fully retracted and the lower pins 44′ are fully expanded, then normally-open contacts 46g and 46h of the upper pin limit switches 46 will be closed, energizing relay coil UPO; and normally-open contacts 46′e and 46′f will be closed, energizing relay coil BPI$n$. If the stroking jack is not fully expanded, then contact 32c of the stroking jack limit switch 32 will be open, de-energizing the "limit switch expanded" relay LSE. Thus, relay contact LSEb will be closed, and fast retract solenoid 180A will be energized across the line voltage $L_1$, $L_2$ through contacts 72i of the function switch, relay contacts PEa or PRa, contacts 72s or 72v of the function switch, and through contacts 72t and 72u of the function switch and normally closed contacts LSEb of the "limit switch expanded" relay LSE. If the stroking jack is fully expanded, then the fast retract solenoid 180A will be energized across the line voltage $L_1$, $L_2$ through contacts 72i of the function switch, relay contacts PEa or PRa, contacts 72s or 72v and 72t or 72u of the function switch, contacts LSEc of relay LSE, and either contacts UPI$nd$ or contacts BPI$nd$ of relays UPI$n$ and BPI$n$, depending upon whether the upper pins 44 or the lower pins 44′ of the pin jacks are extended. The line voltage $L_1$, $L_2$ may be 110 volt, 60 cycle alternating current.

Turning to the hydraulic system, positioning of jack control lever 110 upon "Retract" when the function switch 72 is on "Raise Barge" or "Raise Leg," energizes the retract solenoid 262b of valve 260 and the solenoid 202 for the relief valve 228 for the vane pump 132 for the leg. When energized, relief valve solenoid 202 closes relief valve 228 and forces the pump 132 for the leg to pump to sequence valve 186 through check valve 184; vane pump 132 also pumps to the accumulators 138 through pressure control valve 192. When the accumulators are charged to a predetermined value, for example 1100 p.s.i., sequence valve 186 is opened. As mentioned, the retract solenoid 262b of the four-way double solenoid valve 260 is also energized by moving the jack control lever 110 to its "Retract" position. Thus, the fluid coming from vane pump 132 through the sequence valve 186 is valved by four-way valve 260 to the rod side 190′ of the stroking jacks 16. When the pressure rises to a predetermined value, for example 300 p.s.i., pressure switch 264 closes its electrical contacts and energizes the solenoid valve 266, directing pilot pressure to mechanically open the blocking valves 188 at the ram side 190 of the stroking jacks. Opening of blocking valves 188 permits fluid to escape from the ram side 190 of the jacks 16 through the blocking valves and the four-way valve 260 to valves 250 and 252. As mentioned, the fast retract solenoid 180 is energized. Thus, fast retract valve 250 is open and the fluid passes through valves 250 and 252 to the hydraulic reservoir 216. The opening of valve 250 serves to bypass throttling valve 252 and permits a rapid drain of the hydraulic fluid and a consequent "Fast Retract" of stroking jacks 16. When the jack control lever 110 is moved to its center or "Stop" position, relay coil PR de-energizes, opening its contacts PRa and thereby de-energizing the fast retract solenoid 180A; simultaneously, solenoids 272b and 266A will be de-energized, centering four-way valve 260 and blocking valve 188.

If the function switch 72 is turned to its "Lower Leg" position, the "Fast Retract" operation will proceed in a similar manner as that just described with reference to the "Raise Barge" and "Raise Leg" positions of the function switch, with the exception that contacts 72t and 72u are now open, so that when the jacks 16 are fully retracted relay contacts LSRb will open, de-energizing the fast retract solenoid 180A and thus slowing the retract speed of the jacks. This is done since the weight of the leg causes the jacks 16 to retract quite fast with the fast retract valve energized. The slow retract allows time for the bottom pins 44′ to insert into the pin rack on the leg.

The fast retract solenoid 180A is energized only when the jacks for that leg are being controlled at the master control console 52 and the function switch 72 at the master control console is in other than its "Lower Barge" position. At other times the fast retract solenoid 180A is not energized and bypass valve 250 is closed, forcing the fluid to return through throttling valve 252 and providing a "Slow Retract" of stroking jacks 16. In the "Slow Retract" mode of operation, positioning the jack control lever 74 or 110 (depending upon whether control is at the local control panel or the master control console) energizes the retract solenoid 262b and the relief valve solenoid 202 for the vane pump 132 for the leg whose jack control lever has been positioned. When energized, relief valve solenoid 202 closes relief valve 228 and forces the vane pump 132 for the leg to pump to sequence valve 186 through check valve 184. The vane pump also pumps to the accumulators 138 through the pump's pilot operated check valve 192. When the accumulators are charged to a predetermined pressure, for example 1100 p.s.i., sequence valve 186 is opened. As mentioned, the retract solenoid 262b of the four-way, double solenoid valve 260 is also energized at this time. Thus, the fluid coming from the vane pump 132 through the sequence valve 186 is valved by the four-way valve 260 to the rod side 190' of the main jacks. When the pressure rises to a predetermined value, for example 300 p.s.i., pressure switch 264 closes and energizes solenoid 266 which directs pilot pressure to mechanically open the blocking valves 188 at the ram side 190 of the stroking jacks. This permits fluid to escape from the ram side of the jacks, through blocking valves 188 and the four-way valve 260 to flow control valve 252. Since the fast retract solenoid 180A is not energized, valve 250 is closed; thus all the returning fluid must pass through throttling valve 252 to reach the hydraulic reservoir 216. Flow control or throttling valve 252 is a needle-type valve which permits only a limited rate of flow through it, thereby limiting the retract speed of the stroking jacks 16. The retract speed in the "Slow Retract" mode of operation may be one third of that in the "Fast Retract" mode of operation, or less. Limiting the rate of retract when the jacking apparatus is in local manual control minimizes the possibility of error by the operator and enables the jacking at the leg to be better synchronized with that at other legs. Limiting the rate of retract when the barge is being lowered limits the rate of descent of the barge, providing more satisfactory control over the same.

*Illustrative jacking sequence*

FIGS. 6A to 6I, inclusive, are simplified representations of pin jacks 18 and 18', stroking jacks 16 and the relay switching elements of the electrical control circuit of FIG. 4 during a typical automatic sequence of operation, namely "Lower Leg." As will be noted, the operator of the master control console 52 can control and monitor the entire "Lower Leg" sequence and in the absence of his exercising any control the sequence proceeds automatically.

Referring to FIG. 4, to start the sequence the jack control lever 110 for the leg or legs is placed in its "Expand" position, the operation switch 108 for each leg to be jacked is turned to its "Automatic" position, closing contacts 108b, c and e, and the function switch 72 for each leg to be jacked is turned to its "Lower Leg" position, closing contacts 72a, c, e, g, i, k, m, p, q, s, v and x. Assuming, as shown in FIG. 6A, that the stroking jack 16 at a given leg 12 is extended, that pin 44 of the upper pin jack 18 is extended within the leg, and that pin 44' of the lower pin jack 18' is retracted, normally-open contacts 46a, c, e and f of the upper pin limit switches 46 and normally-open contacts 46'g, h, b and d of the lower pin limit switches 46' are closed. "Bottom Pin Out" relay coil BPO and "Upper Pin In" relay coil UPIn are then energized across the line voltage $L_1$, $L_2$. Normally-closed relay contacts BPOa, BPOb and UPIn are then open, and normally-open relay contacts BPOc and UPINb close. As shown in FIG. 6A, the retract solenoid 262b of four-way, double solenoid valve 260 is then energized. Thus, referring to FIG. 4, line voltage $L_1$ is applied to the retract solenoid 262b through contacts 72q of the function switch, relay contacts BPOc, contacts 72g of the function switch, contacts 108b of the operation switch, the contacts of the jack control lever switch 110, and contacts 72i of the function switch.

Energization of retract solenoid 262b causes the hydraulic system to start retracting the stroking jack 16. When the stroking jack is nearly fully retracted, the stroking jack limit switch 32 connected between the yokes 14, 14' of the jacking assembly trips, closing its contacts 32b, d, g and h. Line voltage $L_1$, $L_2$ is then impressed across "Limit Switch Retracted" relay coil LSR, closing its normally-open contact LSRa. Tripping of the stroking jack limit switch 32 also causes the bottom pins 44' to expand and try to enter leg 12, opening contacts 46'g and 46'h and de-energizing the "Bottom Pin Out" relay coil BPO. The bottom pins 44' are caused to expand by the opening of relay contacts 170B–a caused by the energizing of relay coil 170A when line voltage $L_1$, $L_2$ was impressed across the coil from contacts 72x through stroking jack limit switch contacts 32g and pin control switch contacts 76b. As shown in FIG. 6B, bottom pin 44' cannot fully expand until jack 16 retracts sufficiently for the bottom pin to enter the leg. While the bottom pin is in the position shown in FIG. 6B, the retract solenoid 262b is energized through normally-closed relay contacts BPInb and BPOb, and jack 16 continues to retract.

When the stroking jacks 16 retract sufficiently for the bottom pins 44' to enter the leg, the bottom pins fully extend as shown in FIG. 6C, and the pin limit switches 46' at the bottom pins close contacts 46'e and 46'f, thereby energizing the "Bottom Pin In" relay coil BPIn. The upper pins then begin to try to retract since "Pull Upper Pin" valve 246 has line voltage $L_1$, $L_2$ impressed across its solenoid 172 directing pilot fluid to the expand ports of pin jacks 18. The line voltage is supplied through relay contacts 170A–a to solenoid 246 through lower pin limit switch contacts 46'i and 46'j. Due to the weight impressed upon the upper pins 44 by leg 12, these pins cannot retract. The retract solenoid 262b is, however, energized through relay contacts LSRa, UPOc, BPIna and BPOb, and jack 16 continues to retract.

When the leg is supported on the lower pins 44' and the upper pins 44 are free as shown in FIG. 6D, the upper pins retract, deactuating their pin limit switches 46 and thereby opening relay contacts 46e and 46f and consequently deactuating relay coil UPIn. At this time, retract solenoid 262b is energized through relay contacts LSRa, UPOc, BPIna and BPOb, and the stroking jacks 16 continue to retract.

When the upper pins 44 are fully retracted as shown in FIG. 6E, the limit switches 46 at the upper pins are actuated so as to close contacts 46g and 46h, thereby energizing the "Upper Pin Out" relay coil UPO. With relays UPO, LSR and BPIn energized, line voltage $L_1$, $L_2$ is applied across the expand solenoid 262a of four-way, double solenoid valve 260 through relay contact UPOa, and the retract solenoid 262b of this valve is de-energized. The stroking jacks 16 are consequently caused to start expanding, with leg 12 being supported on the bottom pins.

When jacks 16 are nearly fully expanded, the stroking jack limit switch 32 connected to the yokes 14, 14' trips, closing its normally-open contacts 32c and thereby energizing the "Limit Switch Expand" relay LSE. As shown in FIG. 6F, the upper pins 44 then start expanding and try to enter the leg, but cannot as jack 16 is not sufficiently expanded. The upper pins start to expand since solenoid 172 is de-energized by the opening of relay contacts 170A–a when relay coil 170B is supplied with $L_2$ line voltage by stroking jack limit switch contacts 32e. De-energizing solenoid 172 allows "Pull Upper Pin" valve 246 to spring-return to its normal position which directs pilot fluid to the expand side of pin jacks 18. Energization of relay coil 170B also closes contacts 170B–a providing $L_1$ line voltage to solenoid 174, but $L_2$ line voltage is denied until upper pins 44 are fully withdrawn closing limit switch contacts 46i and 46j. Since expand solenoid 262a is energized through relay contacts UPO*b* and UPI*n–a*, jacks 16 continue to expand.

When the jacks expand sufficiently for the upper pins to enter the leg as shown in FIG. 6G, the upper pin limit switches 46 are actuated, closing their contacts 46*e* and 46*f* and thereby energizing the "Upper Pin In" relay UPI*n*. Normally-open relay contacts UPI*nb* then close. The bottom pins then try to retract since line voltage $L_1$, $L_2$ is impressed on solenoid 174 from relay contact 170B–*a* to solenoid 174 to upper pin limit switch contacts 46*i* and 46*j*, energizing solenoid 174 and shifting valve 248 so as to direct pilot fluid to the expand ports of pin jacks 18′. Due to the weight impressed upon the lower pins 44′ by the leg the lower pin jacks 18′ cannot retract and the jacks 16 continue to expand, with solenoid 262*a* being energized through relay contacts LSE*a*, BPO*a*, UPI*nb* and UPO*b*.

When the stroking jacks 16 have expanded sufficiently as shown in FIG. 6H, the leg 12 is supported on the upper pins 44, and the bottom pins are free to retract. As they start to retract, the lower pin limit switches 46′ are deactuated, thereby opening contacts 46′*e* and 46′*f* and de-energizing the "Bottom Pin In" relay coil BPI*n*. "Expand" solenoid 262*a* continues to be energized through the same relay contacts as in the step in the sequence shown in FIG. 6G, and the jacks 16 consequently continue to expand.

When the lower pins 44′ have fully retracted as shown in FIG. 6I, the lower pin limit switches 46′ are actuated, closing their contacts 46′*e* and 46′*f* and thereby energizing the "Bottom Pin Out" relay coil BPO. Jacks 16, pins 44, 44′ and the control circuit are now once again in the condition shown in FIG. 6A, and the sequence of operation is now automatically repeated unless the operator of the master control console 52 directs otherwise by changing the position of control switches 72, 108 or 110 on console 52.

In a similar manner as just described with reference to a "Lower Leg" sequence of operation, the operations of "Raise Leg," "Lower Barge" and "Raise Barge" may also be readily obtained with the jacking apparatus and controls of this invention by use of the controls on the master control console, including jack control lever 110, operation switch 108 and function switch 72.

Turning now to a consideration of heat-saving features in the described embodiment of this invention, as has been indicated above relief valves 228 at the pressure sides of the vane pumps 132 serve to limit the output of the vane pumps to that required to lift the dead weight of the barge, and relief valve 270 serves to limit the maximum pressure supplied to the rod side 190′ of the stroking jacks 16 to just above that required to retract the jacks' cylinders under no load at "Fast Retract." When lowering the barge with the vane pumps 132 for the leg operatively connected to the rod side 190′ of the stroking jacks 16, the rod side of the stroking jacks can utilize only about half of the capacity of the leg's vane pump 132. By allowing fluid to bypass at a pressure lower than the setting of the pump's relief valve 228, relief valve 270 serves to provide that less heat be built up in the hydraulic line than would otherwise be the case.

A second heat saving feature of the illustrated embodiment of this invention is that the two high pressure piston pumps 136 are under load only when charging the accumulators 138 and when directed by switches 130 and 134 on the pump control panel 58 of the master control console to "Preload" a leg. Similarly, the vane pumps 132 are generally under load only when the jacks 16, 18, 18′ on its assigned leg are either expanding or retracting. When they are not under load, pumps 132 and 136 are dumped to reservoir 216 by the opening of their respective relief valves 240, 228. This results in a considerable saving in the heat load to be removed by the heat exchanger 226.

A further heat-saving feature of the embodiment of this invention which is described herein is that in normal operation pressure switch 208 actuates the piston pumps 138 only when the pressure in the accumulator 138 is below a predetermined value and the accumulators need charging. Thus, in normal operation, the piston pumps 136 are loaded intermittently rather than continuously. When the pressure of the fluid being supplied to the accumulators reaches a predetermined value, valve 206 closes preventing an overcharge of the accumulator 138. Valve 206′ meters out pilot pressure from the accumulators at its predetermined pressure setting. The difference between the pressure setting of valve 206 and the lower pressure setting of valve 206′ represents pressure-energy which is stored in the accumulators 138. As mentioned, if pressure in the accumulators falls below a predetermined value, in normal operation pressure switch 208 actuates one or both of the high pressure pumps 136. If for some reason the accumulators are not supplying sufficient pilot pressure in cooperation with high pressure pumps 136, the pilot-operated sequence valve 186 will close and the accumulators will be charged by one or more of the lower-pressure pumps 132. Further, if the accumulators 138 are not properly storing pressure due for example to a lack of hydraulic fluid, pilot-operated sequence valve 186 will flutter between its open and closed position as the pressure first rises sufficiently to open it, then drops, and then rises once again. The average pressure passing through the sequence valve 186 from the vane pumps 132 is sufficient to operate the jacks 16, 18, 18′ at the leg despite the breakdown of the accumulators. Since pilot pressure is normally supplied by the accumulators 138 with only intermittent operation of pumps 136 being required to maintain the pilot pressure, a considerable heat load is avoided as compared to a system where a pump must operate continuously to supply pilot pressure.

Considering a further heat-saving feature of the described embodiment of this invention, the blocking valves 188 at the ram side 190 of the stroking jacks 16 are actuated independently of the pressure actually required to move the jacks 16. A pressure switch 264 senses the pressure in the small or rod sides 190′ of jacks 16 and, as long as the pressure is above the setting of pressure switch 264, this switch triggers valve 266 and supplies pilot pressure to the blocking valves 188, opening these valves. Thus, the vane pump 132 for the leg only has to supply the pressure which is actually required to move the jacks 16, rather than any excess pressure which might be required for example to unseat poppet-type valves. Pressure switch 264 also serves to protect against a loss in pressure at the rod sides 190′ of the stroking jacks 16 due for example to a leak in the hydraulic piping, as, if the pressure falls below the setting of the pressure switch 264, the pressure switch will cause the jacks to be stopped. Similarly, blocking valves 188 serve to protect against a loss in pressure at the ram sides 190 of the stroking jacks 16 as they will close if there is a leak in the hydraulic piping leading to them from valve 260.

As a result of the heat-saving features of the described embodiment of the jacking apparatus and controls of this invention, the number and capacity of the heat exchangers 216 which are required for the hydraulic system is minimized. Also, the apparatus can be operated without heat exchangers long enough to stabilize the platform or barge in the case of a sudden storm or other emergency without damaging the pumps or valves of the system or causing them to malfunction.

It should be noted that relatively low cost, vane-type pumps are used in normal operation to move the platform and its supporting legs with respect to one another, and only two higher-cost piston pumps are employed. In normal operation, one of the two piston pumps functions as an auxiliary which is energized only when needed. Since lower pressure vane-type pumps suffice to operate the jacking apparatus and controls of this invention in normal operation rather than high pressure, high volume pumps, motors of lower rating may be used to drive the pumps, resulting in a further saving in cost. Since motors of lower rating are required, there is a further saving in that auxiliary equipment such as reduced-voltage starters to prevent an electrical overload on the motors are not required.

It is seen that by practicing this invention in the manners described, it is possible to accomplish the objects of this invention discussed above, including the provision of jacking apparatus and controls which can be either wholly monitored, synchronized and controlled at a central master control, or wholly monitored and controlled at local control panels adjacent each leg, or simultaneously partially controlled at both a master control panel and also at local control panels. Further, it is seen that it is possible to provide jacking apparatus and controls in which simultaneous disengagement of all pins or other means connecting a leg to the platform is prevented, and in which selected hydraulic members can be removed from the system and their function redistributed to other members in the system. Further, it is evident that jacking apparatus and controls according to the disclosure of this invention can be operated by a relatively inexperienced operator, and in addition that it is possible to provide a system which lowers the barge or other platform at a low rate of speed as well as a system in which the requirement for heat exchangers is minimized and which has other desirable features of safety, efficiency, ease of operation and economy.

Although this invention has been described with a certain degree of particularity, it is understood that the present disclosure has been made only by way of example, and that changes may be made in the details of construction and method of operation and in the combination and arrangement of parts without departing from the spirit and scope of the invention. For example, other types of switching means may be substituted for the particular relay and solenoid switching means which were employed in the illustrated embodiment of this invention without departing from the spirit and scope of this invention.

Further, although the jacking apparatus and controls of this invention are described herein with reference to a jacking means such as that described in the aforesaid U.S. Patent Nos. 2,920,870 and 2,932,486, it will be evident from the following description that jacking apparatus and controls within the scope of this invention may be employed with other types of jacking means. For example, it may be employed with jacking means such as that described in the aforesaid U.S. Patent No. 2,775,869 in which upper and lower members frictionally engage the walls of the legs.

What is claimed is:

1. In jacking apparatus and controls for platforms which are moveable with respect to support legs, the improvement comprising expandable and retractable hydraulic upper jack means and vertically aligned hydraulic lower jack means adjacent each support leg for reciprocally engaging vertically spaced apart portions of the respective adjacent support leg;

expandable and retractable hydraulic stroking jack means operatively secured between each pair of vertically aligned upper and lower jack means for varying the vertical spacing therebetween;

a hydraulic header conduit;

a plurality of first hydraulic pumps corresponding in number to the number of support legs, and each being hydraulically connected to the said stroking jack means at a different support leg and also to said header conduit;

at least one second hydraulic pump hydraulically connected to said header conduit;

a plurality of first blocking valves corresponding in number to the number of support legs, and each being hydraulically connected between and to said header conduit and the hydraulic connection between one of said first pumps and its respective said stroking jack means; and a first blocking valve control means operatively connected to said first blocking valves for selectively opening said first blocking valves to permit a flow of hydraulic fluid therethrough, whereby any said first pump and said second pump may supply said stroking jack means at any support leg.

2. The improvement set forth in claim 1 further comprising a plurality of first check valves corresponding in number to the number of support legs, each of which is hydraulically interposed in the hydraulic connection between a said first pump and the said stroking jack means to which the said first pump is hydraulically connected in such a manner as to prevent a flow of hydraulic fluid past each said check valve to its respective first pump.

3. The improvement set forth in claim 2 further comprising a plurality of second check valves corresponding in number to the number of said second pumps, each of which is hydraulically interposed in the hydraulic connection between a said second pump and the said header conduit in such a manner as to prevent a flow of hydraulic fluid past each said second check valve to its respective second pump.

4. The improvement set forth in claim 1 further comprising a hydraulic reservoir hydraulically connected to each of said first and second pumps, a second blocking valve hydraulically interposed in the hydraulic connection between said hydraulic reservoir and said second pump, a second blocking valve control means operatively connected to said second blocking valve for opening said second blocking valve to permit a flow of hydraulic fluid therethrough to said reservoir, a plurality of third blocking valves corresponding in number to the number of said first pumps, and each being hydraulically interposed in the hydraulic connection between said hydraulic reservoir and a different one of said first pumps, and a third blocking valve control means operatively connected to said second blocking valves for selectively opening one or more of said third blocking valves to permit a flow of hydraulic fluid therethrough to said reservoir.

5. The improvement set forth in claim 1 further comprising means for preloading a selected support leg by driving the support leg to refusal in a foundation, including a preload control means electrically connected to each said first and said second blocking valve control means for causing said first blocking valve control means for the selected leg to open its said first blocking valve and for causing said second blocking valve control means to close its said second blocking valve, whereby hydraulic fluid flows from said second hydraulic pump, and through said header conduit and the said first blocking valve for the selected support leg to the said stroking jack means for the selected support leg.

6. The improvement set forth in claim 1 further comprising master control means operatively connected to each said upper, lower and stroking jack means for synchronizing and controlling the expansion and retraction of each said upper and lower jack means and each said stroking jack means at a central location.

7. The improvement set forth in claim 6 further comprising local control means adjacent each support leg for controlling the expansion and retraction of said upper, lower and stroking jack means for the leg adjacent thereto, and wherein said master control means includes means for transferring control over the expansion and retraction of said upper, lower and stroking jack means for a selected support leg to the said local control means adjacent thereto, and for synchronizing and controlling the expansion and retraction of the remaining said upper, lower and stroking jack means at a central location.

8. The improvement set forth in claim 1 wherein each said stroking jack means is further characterized by a ram side to which hydraulic fluid is supplied under pressure to expand said stroking jack means and a rod side to which hydraulic fluid is supplied under pressure to retract said stroking jack means, and wherein the improvement further comprises a plurality of first relief valve means corresponding in number to the number of said first pumps, each being hydraulically connected to its respective first pump, for limiting the maximum pressure of the hydraulic fluid supplied by its respective first pump to a predetermined value, and a plurality of second relief valve means corresponding in number to the number of support legs, each being hydraulically connected to the rod side of its respective stroking jack means, for limiting the maximum pressure of the hydraulic fluid there-supplied to a predetermined pressure which is lower than the predetermined pressure of said first relief valve means, whereby said second relief valve means limits the pressure of the hydraulic fluid at the rod side of its respective stroking jack means to a value less than that which said first relief means permits its respective first pump to supply, resulting in less heat being generated when hydraulic fluid is supplied by said first pumps to the rod side of said stroking jack means than might otherwise be the case.

9. The improvement set forth in claim 1 further comprising a motor which is mechanically coupled to said second pump means and also mechanically coupled to at least one of said first pump means.

10. The improvement set forth in claim 1 further comprising a hydraulic accumulator hydraulically connected to said header conduit, a pressure switch hydraulically connected to said accumulator and responsive to the pressure therewithin for providing a switching indication when the pressure therewithin is below a predetermined value, and means responsive to the switching indication of said pressure switch for providing for a flow of hydraulic fluid from said second pump to said accumulator whenever the pressure therewithin is below said predetermined value, whereby said hydraulic accumulator may be intermittently charged by said second pump.

11. The improvement in jacking apparatus and controls for platforms which are moveable with respect to support legs set forth in claim 10, further comprising a pilot pressure conduit hydraulically connected to said accumulator for pilot operated members of the jacking apparatus and controls a first pressure valve means interposed in the hydraulic connection between said header conduit and said accumulator for limiting the maximum pressure of the fluid supplied to said accumulator from said header conduit to a predetermined value, and a second pressure valve means hydraulically connected to said first pressure valve and to said accumulator for limiting the maximum pressure of the fluid supplied by said accumulator to said pilot pressure conduit to a predetermined value which is less than the predetermined value of said first pressure valve.

12. The improvement set forth in claim 1 wherein each said stroking jack means is further characterized by a ram side to which hydraulic fluid is supplied under pressure to expand said stroking jack means and a rod side to which hydraulic fluid is supplied under pressure to retract said stroking jack means, and wherein the improvement further comprises a hydraulic accumulator means hydraulically connected to said header conduit for supplying pilot pressure fluid;

a plurality of four-way valves corresponding in number to the number of support legs, each of which is hydraulically interposed in the hydraulic connection between a different said first pump and the ram and rod sides of the first pump's respective said stroking jack means;

a plurality of fourth blocking valves each of which is hydraulically interposed in the hydraulic connection between a said four-way valve and the ram side of its respective said stroking jack means and each of which is actuated by pilot pressure fluid from said accumulator;

a plurality of pressure switch means, each of which is hydraulically connected to the rod side of a said stroking jack means for providing switching indications when the pressure of the hydraulic fluid in the rod side of its respective stroking jack means is above and below a predetermined pressure; and a plurality of check valve means, each of which is interposed in the hydraulic pilot fluid connection between said acumulator and a said fourth blocking valve, and each of which is responsive to the switching indication of a said pressure switch, whereby pilot pressure is supplied to said fourth blocking valves to open the same only when the pressure of the fluid in the rod side of its respective stroking jack means is above the predetermined pressure of its respective pressure switch.

13. The improvement in jacking apparatus and controls for platforms which are moveable with respect to support legs set forth in claim 12, further comprising retract means operably connected to said stroking jack means for providing a slower rate of retraction of said stroking jack means when the platform is lowered by said stroking jack means on its support legs, than when the platform is raised by said stroking jack means on its support legs.

14. The improvement set forth in claim 13, further comprising a hydraulic reservoir hydraulically connected to each of said first and said second pumps, and wherein said retract means includes a fast retract switching means for providing a switching indication when the platform is to be raised on its support legs, a fast retract valve means hydraulically connected between said four-way valve and said hydraulic reservoir for opening only in response to the switching indication of said fast retract switching means, and a throttling valve hydraulically connected in parallel with respect to said fast retract valve, which throttling valve permits hydraulic fluid to flow therethrough at a slower rate than is permitted to flow through said fast retract valve when said fast retract valve is opened in response to the switching indication of said switching, whereby when said fast retract valve is closed hydraulic fluid flowing from said four-way valve must flow through said throttling valve to return to said hydraulic reservoir thereby providing a slower rate of flow and a consequent slower rate of retraction of said stroking jack means than when said fast retract valve is opened.

15. The improvement set forth in claim 14 wherein said throttling valve is adjustable to permit varying rates of passage of hydraulic fluid therethrough.

16. The improvement set forth in claim 12 further comprising a plurality of sequence valve means corresponding in number to the number of support legs, each of which is hydraulically interposed in the hydraulic connection between a different said first pump and its respective said stroking jack means, and each of which is responsive to the pressure of the pilot pressure fluid supplied by said accumulator, for closing the hydraulic connection between its respective first pump and its respective stroking jack means if the pressure of the pilot pressure supplied by said accumulator is below a predetermined value and for opening the same if it is above a predetermined value.

17. The improvement set forth in claim 12 wherein each said four-way valve is further characterized by being an electrically actuated, double solenoid valve which is operatively connected to a said first pump and a said stroking jack means in a manner as to valve hydraulic fluid entering it from its respective first pump to the ram side of its respective said stroking jack means when one of its solenoids is electrically energized, and to the rod side of its respective stroking jack means when the other of its solenoids is electricaly energized, and wherein the improvement further comprises means for selectively electrically energizing the one and the other solenoids of said four-way valve, whereby energization of said one solenoid will direct hydraulic fluid to the ram side of said stroking jack means to expand said stroking jack means and energization of said other solenoid will direct hydraulic fluid to the rod side of said stroking jack means to retract said stroking jack means.

18. The improvement set forth in claim 17 wherein each said electrically-actuated, double solenoid four-way valve is further characterized by being operatively connected to a said first pump and a said stroking jack means in a manner as to retain fluid within the ram side of its respective jack means therewithin and to simultaneously allow fluid within the rod side of its respective jack means to drain through said four-way valve when both its said one and its said other solenoids are de-energized, and said means for selectively electrically energizing said one and said other solenoid of said four-way valve is further characterized by means for selectively de-energizing both said one and said other solenoids.

19. Jacking apparatus and controls for platforms which are movable with respect to a plurality of support legs comprising expandable and retractable upper jack means and vertically aligned lower jack means adjacent each support leg for reciprocally engaging vertically spaced apart portions of the respective adjacent support leg, expandable and retractable stroking jack means operatively secured between each pair of vertically aligned upper and lower jack means for varying the vertical spacing therebetween, master control means operatively connected to each said upper, lower and stroking jack means for controlling the expansion and retraction of each said upper and lower jack means and each said stroking jack means at a central location, a plurality of pump means operatively connected to said upper, lower and stroking jack means for supplying fluid under pressure to said upper and lower jack means and said stroking jack means, and means operatively connected to said pump means and said upper, lower and stroking jack means for enabling a selected one of said plurality of pump means to supply fluid under pressure to selected upper and lower jack means and selected stroking jack means.

20. Jacking apparatus and controls for platforms which are movable with respect to a plurality of support legs, comprising expandable and retractable upper jack means and vertically aligned lower jack means adjacent each support leg for reciprocally engaging vertically spaced apart portions of the respective adjacent support leg, expandable and retractable stroking jack means operatively secured between each pair of vertically aligned upper and lower jack means for varying the vertical spacing therebetween, local control means adjacent each support leg for controlling the expansion and retraction of said upper, lower and stroking jack means for the leg adjacent thereto, master control means operatively connected to each said upper, lower and stroking jack means for transferring control over the expansion and retraction of said upper, lower and stroking jack means for a selected support leg to the said local control means adjacent thereto, and for controlling the expansion and retraction of the remaining said upper, lower and stroking jack means at a central location, a plurality of pump means operatively connected to said upper, lower and stroking jack means for supplying fluid under pressure to said upper and lower jack means and said stroking jack means, and means operatively connected to said pump means and said upper, lower and stroking jack means for enabling a selected one of said plurality of pump means to supply fluid under pressure to selected upper and lower jack means and selected stroking jack means.

21. Jacking apparatus and controls for platforms which are moveable with respect to support legs, comprising expandable and retractable upper jack means and vertically aligned lower jack means adjacent each support leg for reciprocally engaging vertically spaced apart portions of the respective adjacent support leg, expandable and retractable stroking jack means operatively secured between each pair of vertically aligned upper and lower jack means for varying the vertical spacing therebetween, upper jack switching means for each support leg responsive to expansion and retraction of the said upper jack means at the respective leg for providing a switching indication when its respective upper jack means is expanded and when it is retracted, lower jack switching means for each support leg responsive to expansion and retraction of the said lower jack means at the respective support leg for providing a switching indication when its respective lower jack means is expanded and when it is retracted, means for each support leg responsive to the switching indications provided by the said upper and lower jack switching means for the respective leg for preventing the retraction of each of said upper jack means for the respective leg when its said vertically aligned lower jack means is not expanded, and for preventing the retraction of each of said lower jack means for the respective leg when its said upper vertically aligned upper jack means is not expanded, and master control means operatively connected to each said upper, lower and stroking jack means and each said upper and lower jack switching means for controlling the expansion of each said stroking jack means at a control location.

22. Jacking apparatus and controls for platforms which are moveable with respect to support legs, comprising expandable and reactable upper jack means and vertically aligned lower jack means adjacent each support leg for reciprocally engaging vertically spaced apart portions of the respective adjacent support leg, expandable and retractable stroking jack means operatively secured between each pair of vertically aligned upper and lower jack means for varying the vertical spacing therebetween, upper jack switching means for each support leg responsive to expansion and retraction of the said upper jack means at the respective leg for providing a switching indication when its respective upper jack means is expanded and when it is retracted, lower jack switching means for each support leg responsive to expansion and retraction of the said lower jack means at the respective support leg for providing a switching indication when its respective lower jack means is expanded and when it is retracted, stroking jack switching means for each support leg responsive to expansion and retraction of the said stroking jack means at the respective suport leg for providing a switching indication when its said respective stroking jack means is expanded and when it is retracted, and master control means operatively connected to each said upper, lower and stroking jack means and each said upper, lower and stroking jack switching means for controlling the expansion and retraction of each said upper, lower and stroking jack means at a central location.

23. Jacking apparatus and controls as set forth in claim 22 wherein each said stroking jack switching means comprises an upper yoke connected to and between a horizontally aligned pair of said upper jack means, a lower yoke connected to and between a horizontally aligned pair of said lower jack means, a telescoping rod connected to and between said upper yoke and lower yoke and including
an inner portion, and
an outer portion slidably mounted on the inner portion and having a slot therein extending along the length thereof, a first striker plate fixedly secured to the outer portion of said telescoping rod, a second striker plate fixedly secured to the inner portion of said telescoping rod, switching means secured to the inner portion of said telescoping rod through the slot in the outer portion of said telescoping rod, and having
a rotatable switching member which is rotatably moved in position upon engagement with said first striker plate and upon engagement with said second striker plate, and
a plurality of electrical contacts responsive to the position of said rotatable switching member.

24. Jacking apparatus and controls as set forth in claim 22 which further includes means operatively connected to said stroking jack means and said upper, lower and stroking jack means for preventing expansion and retraction of said stroking jack means whenever the pair of said vertically aligned upper and lower jack means between which said stroking jack means is connected are both in engagement with their respective support leg and a load is not to be transfered between said upper and lower jack means.

25. Jacking apparatus and controls as set forth in claim 22 which further includes stroking jack visual means responsive to the switching indication provided by the said stroking jack switching means for visually indicating when its respective stroking jack means is expanded and when it is retracted, upper jack visual means responsive to the switching indication provided by said upper jack switching means for visually indicating when its respective upper jack means is expanded and when it is retracted, and lower jack visual means responsive to the switching indication provided by the said lower jack switching means for visually indicating when its respective lower jack means is expanded and when it is retracted.

26. Jacking apparatus and controls as set forth in claim 25 which further includes a local control panel adjacent each support leg, and a master control console, and wherein each of said stroking jack visual means includes a first pilot light means secured to said master control console and responsive to the switching indication provided by the said jack switching means for visually indicating when the respective stroking jack means to which said stroking jack visual means is responsive is fully expanded, a second pilot light means secured to said master control console and responsive to the switching indication provided by the said jack switching means for visually indicating when the respective stroking jack means to which the stroking jack visual means is responsive is fully retracted, a third pilot light means secured to a said local control panel and responsive to the switching indication provided by the said jack switching means for visually indicating when the respective stroking jack means to which the stroking jack visual means is responsive is fully expanded, and a fourth pilot light means secured to a said local control panel and responsive to the switching indication provided by the said jack switching means for visually indicating when the respective stroking jack means to which the stroking jack visual means is responsive is fully retracted.

27. Jacking apparatus and controls as set forth in claim 25 wherein each said upper and lower jack visual means includes a first pilot light means secured to said master control console and responsive to the switching indication provided by the said upper jack switching means for visually indicating when the respective upper jack means to which said upper jack switching means is responsive is extended, a second pilot light means secured to said master control console and responsive to the switching indication provided by the said upper jack switching means for visually indicating when the respective upper jack means to which said upper jack switching means is responsive is retracted, a third pilot light means secured to said master control console and responsive to the switching indication provided by the said lower jack switching means for visually indicating when the respective lower jack means to which said lower jack switching means is responsive is extended, a fourth pilot light means secured to said master control console and responsive to the switching indication provided by the said lower jack switching means for visually indicating when the respective lower jack means to which said lower jack switching means is responsive is retracted, a fifth pilot light means secured to a said local control panel and responsive to the switching indication provided by the said upper jack switching means for visually indicating when the respective upper jack means to which said upper jack switching means is responsive is extended, a sixth pilot light means secured to a said local control panel and responsive to the switching indication provided by the said upper jack switching means for visually indicating when the respective upper jack means to which said upper jack switching means is responsive is retracted, a seventh pilot light means secured to a said local control panel and responsive to the switching indication provided by the said lower jack switching means for visually indicating when the respective lower jack means to which said lower jack switching means is responsive is extended, and an eighth pilot light means secured to a said local control panel and responsive to the switching indication provided by the said lower jack switching means for visually indicating when the respective lower jack means to which lower jack switching means is responsive is retracted.

28. Jacking apparatus and controls for platforms which are moveable with respect to a plurality of support legs, comprising expandable and retractable upper jack means and vertically aligned lower jack means adjacent each support leg for reciprocally engaging vertically spaced apart portions of the respective adjacent support leg, expandable and retractable stroking jack means operatively secured between each pair of vertically aligned upper and lower jack means for varying the vertical spacing therebetween, stroking jack switching means for each support leg responsive to expansion and retraction of the said stroking jack means at the respective support leg for providing a switching indication when its respective said stroking jack means is expanded and when it is retracted, an expand relay for each support leg responsive to the switching indication provided by the said stroking jack switching means for the respective leg for providing a switching indication when the said stroking jack means to which said stroking jack switching means is responsive is expanded, a retract relay for each support leg responsive to the switching indicating provided by the said stroking jack switching means for the respective leg for providing a switching indication when the said stroking jack means to which said stroking jack switching means is responsive is retracted, upper jack switching means for each support leg responsive to expansion and retraction of the said upper jack means at the respective support leg for providing a switching indication when its respective said upper jack means is expanded and when it is retracted, an upper-pin-in relay for each support leg responsive to the switching indication provided by the said upper jack switching means for the respective leg for providing a switching indication when the said upper jack means to which said upper jack switching means is responsive is expanded, an upper-pin-out relay for each support leg responsive to the switching indication provided by the said upper jack switching means for the respective leg for providing a switching indication when the said upper jack means to which said upper jack switching means is responsive is retracted, lower jack switching means for each support leg responsive to expansion and retraction of the said lower jack means at the respective leg for providing a switching indication when its respective said lower jack means is expanded and when it is retracted, a lower-pin-in relay for each support leg responsive to the switching indication provided by the said lower jack switching means for the respective leg for providing a switching indication when the lower jack means to which said lower jack switching means is responsive is expanded, a lower-pin-out relay for each support leg responsive to the switching indication provided by the said lower jack switching means for the respective leg for providing a switching indication when the lower jack means to which said lower jack switching means is responsive is retracted, stroking jack visual means responsive to the switching indication provided by said expanded and said retracted relays for visually indicating when the respective stroking jack means is expanded and when the same is retracted, upper jack visual means responsive to the switching indication provided by said upper-pin-in and said upper-pin-out relays for visually indicating when each respective upper jack means is expanded and when the same is retracted, lower jack visual means responsive to the switching indication provided by said lower-pin-in and said lower-pin-out relays for visually indicating when each respective lower jack means is expanded and when the same is retracted, and master control means operatively connected to each said upper, lower and stroking jacking means and each said upper, lower and stroking jack switching means for controlling the expansion of each said stroking jack means at a central location.

References Cited

UNITED STATES PATENTS

| | | | |
|---|---|---|---|
| 2,920,870 | 1/1960 | Suderow | 254—105 X |
| 2,932,486 | 4/1960 | Suderow | 254—93 |
| 2,944,403 | 7/1960 | Smith | 254—106 X |
| 2,963,868 | 12/1960 | Armstrong | 254—105 X |
| 2,992,812 | 7/1961 | Rasmussen et al. | 254—107 |

OTHELL M. SIMPSON, *Primary Examiner.*